Sept. 8, 1959 V. VON KROGH SUNDT 2,902,874
SPEED CONTROL MECHANISM
Filed May 6, 1957 9 Sheets-Sheet 1

INVENTOR.
VIGO VON KROGH SUNDT
BY
Andrus & Scealer
Attorneys

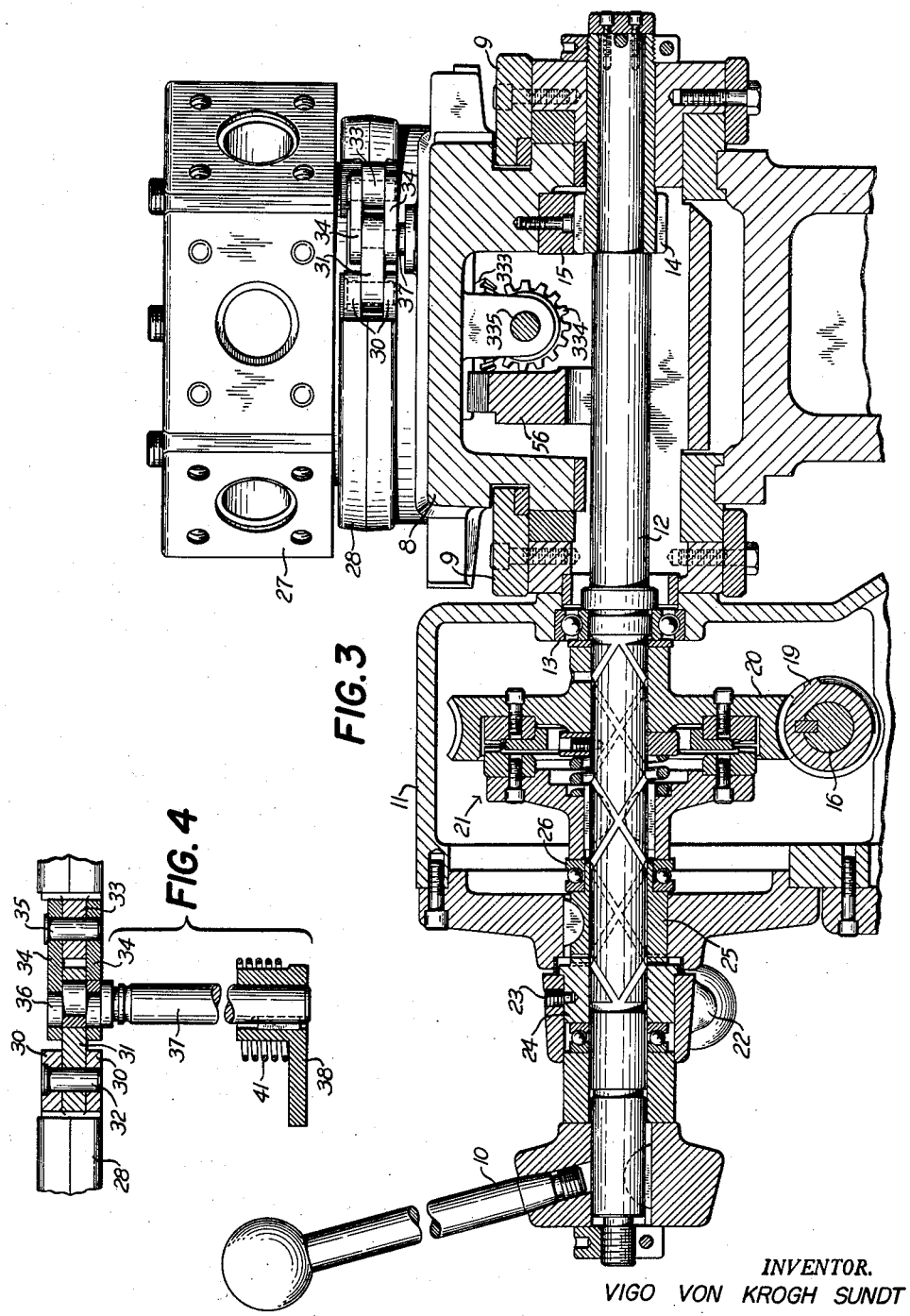

INVENTOR.
VIGO VON KROGH SUNDT
BY
Andrus & Sceales
Attorneys

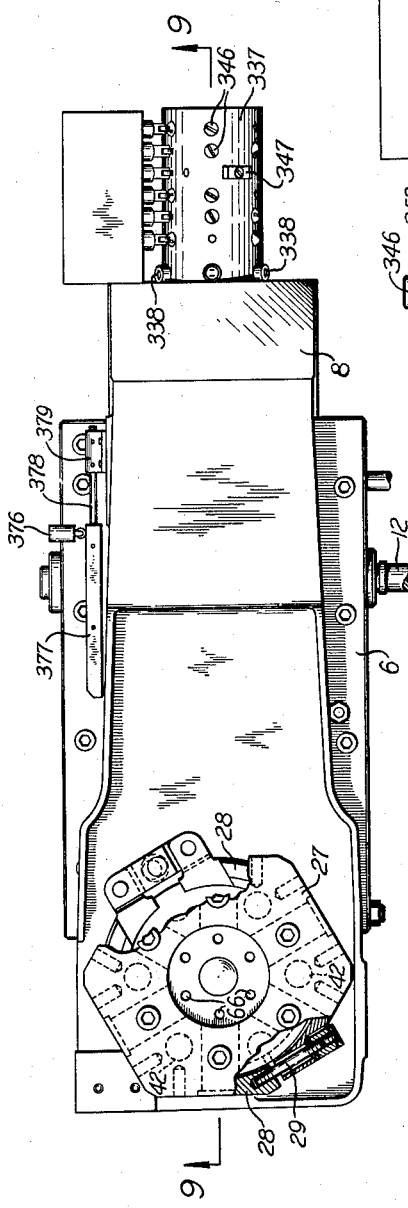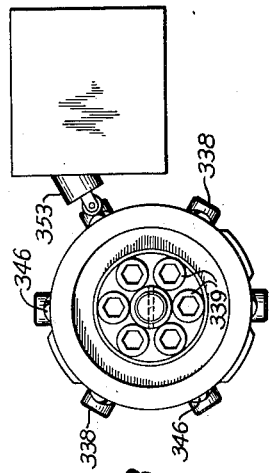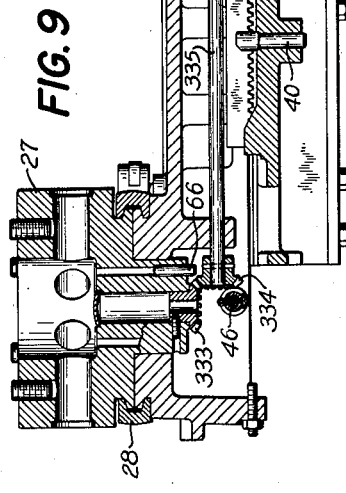

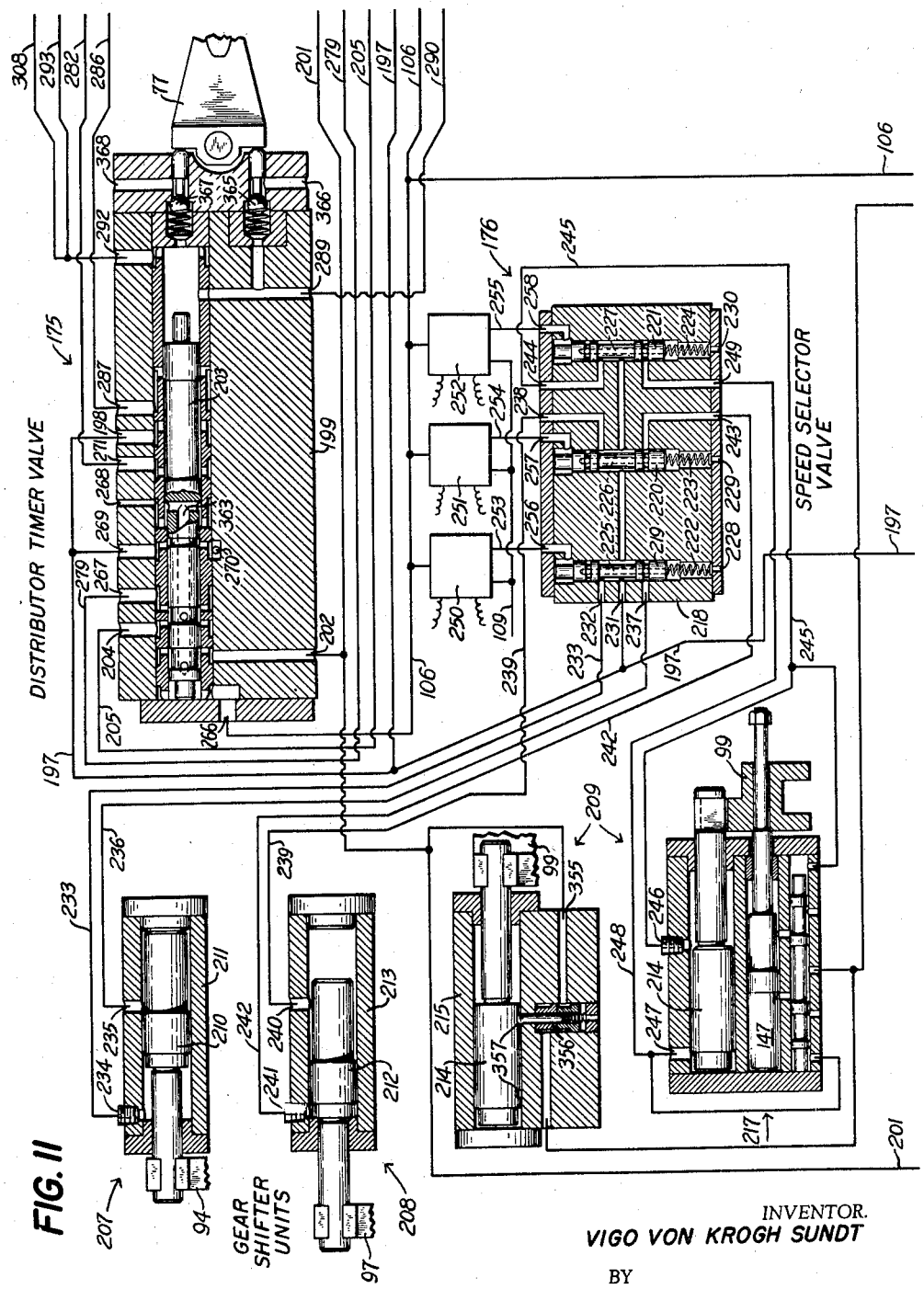

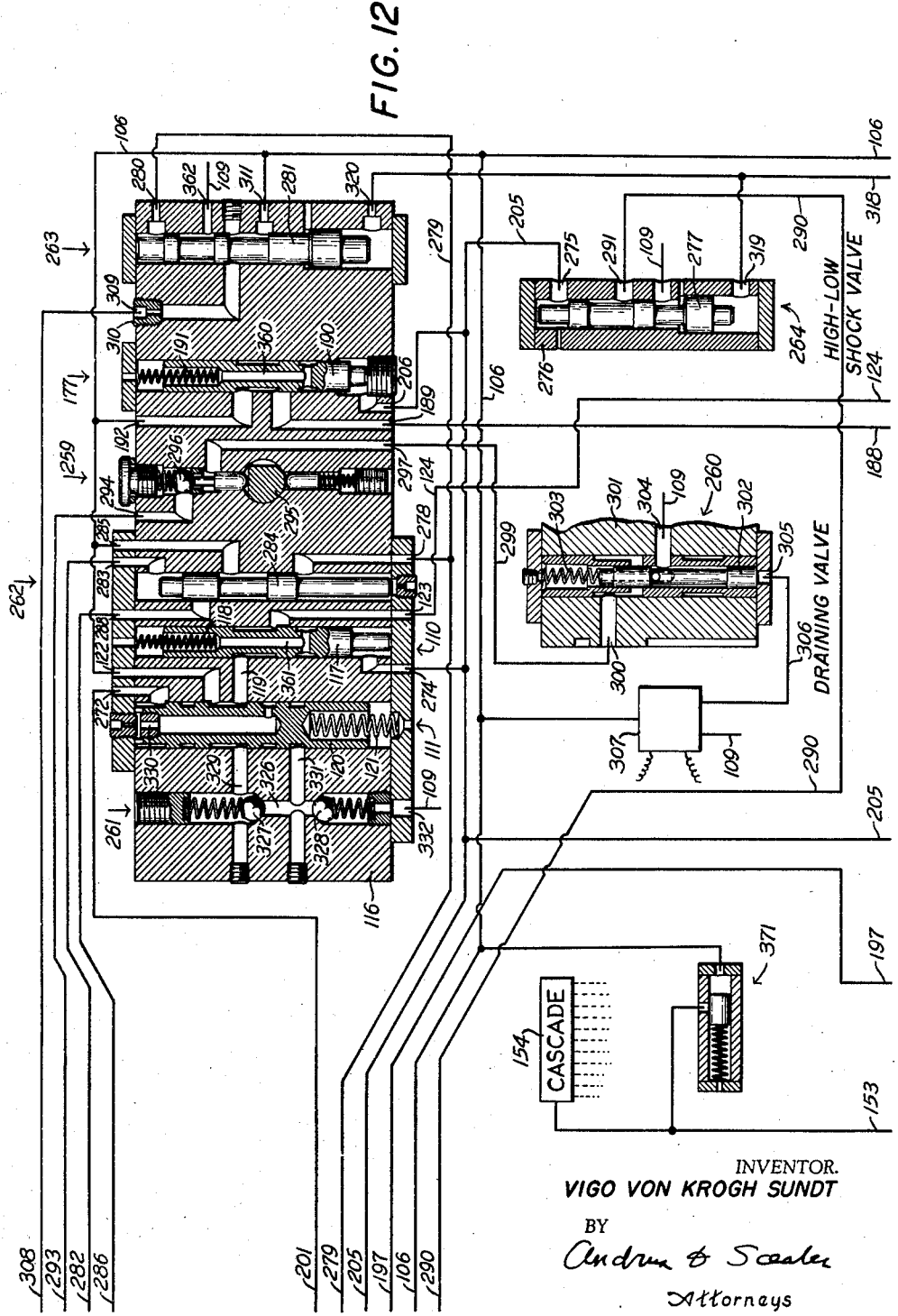

INVENTOR.
VIGO VON KROGH SUNDT

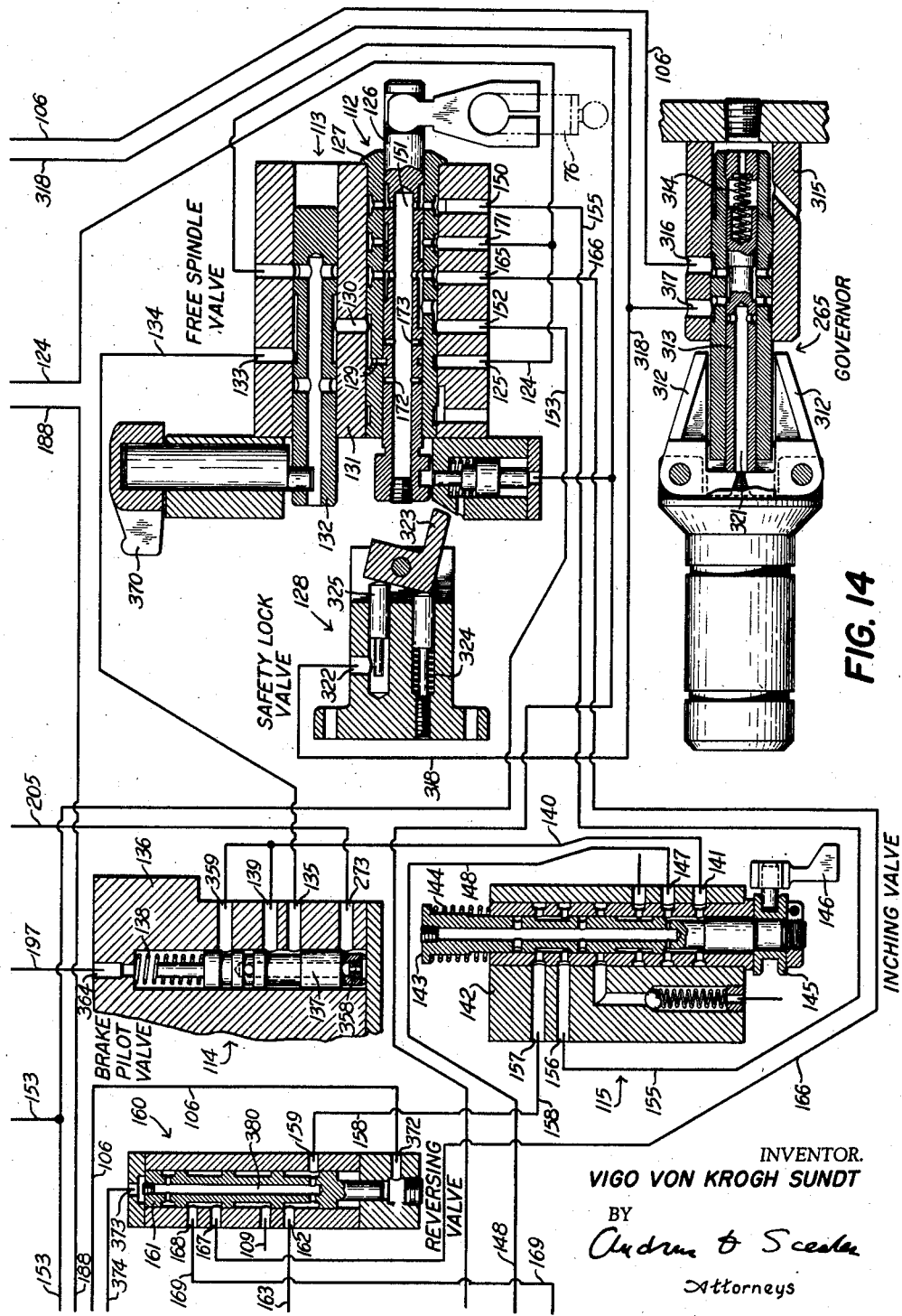

United States Patent Office 2,902,874
Patented Sept. 8, 1959

2,902,874

SPEED CONTROL MECHANISM

Vigo von Krogh Sundt, Madison, Wis., assignor to Gisholt Machine Company, Madison, Wis., a corporation of Wisconsin Application May 6, 1957, Serial No. 657,183

11 Claims. (Cl. 74—364)

This invention relates to a speed control mechanism and more particularly to an automatic mechanism for providing a preselected speed change of a rotating member.

The invention contemplates a hydraulic mechanism capable of producing a cycle whereby the speed of the rotating member is changed. The cycle of the hydraulic mechanism is initiated and controlled by an electric system responsive to the desired changes occurring in the apparatus to which the speed control mechanism is applied. In addition, the invention contemplates novel electrically controlled hydraulic apparatus for automatically reversing the direction of rotation of the rotating member in response to a preselected condition of said apparatus.

The mechanism is adaptable for use in a machine tool having a rotatable member such as the spindle to which the work is secured, and an indexable turret adapted to present a plurality of different tools to the work in succession, as for rough, intermediate and finish cuts. The hydraulic headstock system for producing a spindle speed change cycle is similar to that disclosed in my copending application Serial No. 618,817, filed October 29, 1956, and entitled Machine Tool Headstock Control Mechanism, of which this is a continuation-in-part. When the turret is indexed to present a different tool to the workpiece, the electrical system, which includes a member indexable with the turret, actuates the hydraulic system in a manner to produce the desired spindle speed change commensurate with the particular type of cut to be made.

The accompanying drawings illustrate the best mode presently contemplated by the inventor for carrying out the invention in a machine tool.

In the drawings:

Fig. 3 is a transverse section of a portion of the lathe taken on the turnstile shaft;

Fig. 4 is an enlarged vertical section of the turret clamping mechanism;

Fig. 7 is a top plan view of the saddle and ram with parts broken away and in section; and showing the turret and control drum;

Fig. 8 is an end view of the apparatus of Fig. 7 showing the control drum and switch box;

Fig. 9 is a vertical section taken on line 9—9 of Fig. 7;

Fig. 11 is a diagrammatic view of the left upper portion of the hydraulic system and showing one of the gear shifter units in two different sections;

Fig. 12 is a diagrammatic view of the right upper portion of the hydraulic system;

Fig. 14 is a diagrammatic view of the right lower portion of the hydraulic system.

Figure 1:
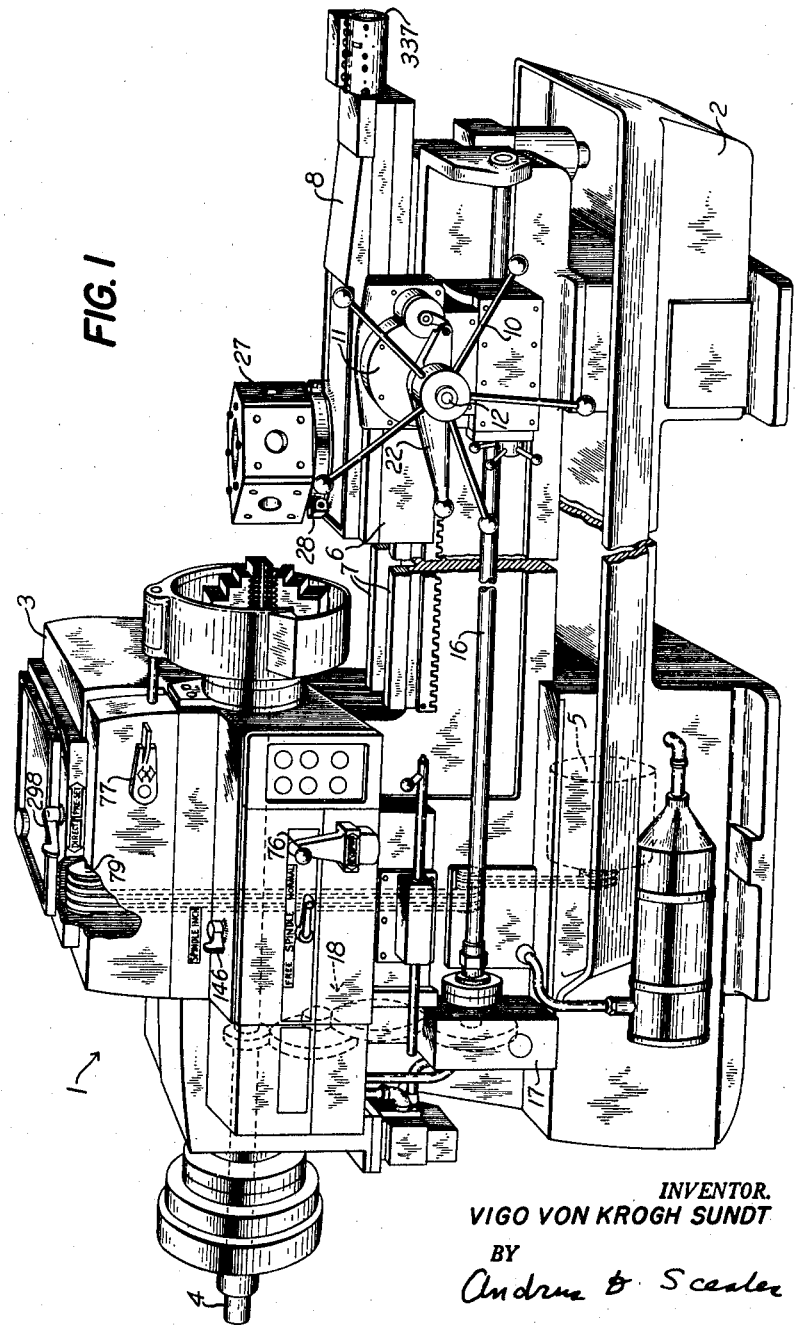
Figure 1 is a broken perspective view of a lathe utilizing the invention.

As shown in Fig. 1 of the drawings, the invention may be utilized in a ram type turret lathe 1 having a bed 2. A headstock 3 is disposed at one end of the bed and contains mechanism for driving a rotatable member, such as a spindle 4, to which a workpiece may be secured for machining operations. A suitable source of power, such as a motor 5 mounted on the base of the lathe, drives the headstock and other mechanism in a manner to be described.

A saddle 6 is mounted for longitudinal adjustment on suitable ways 7 on bed 2. Saddle 6 may be tightly secured to ways 7 by clamps, screws or any suitable means, not shown, and may be adjusted longitudinally by manual or other means.

A turret ram 8 is mounted for longitudinal movement on suitable ways 9 on saddle 6. Ram 8 may be moved in a feed or reverse direction on ways 9 by turning a large turnstile 10 disposed forwardly of the saddle apron 11. Turnstile 10 is secured to a rearwardly extending shaft 12 which passes through saddle 6 and is journaled in suitable bearings 13 centrally thereof. The rear end portion of shaft 12 constitutes a pinion 14 which meshes with a longitudinal rack 15 secured to the underside of ram 8. When an automatic forward feed of ram 8 is desired, shaft 12 is clutched to a feed shaft 16 which extends longitudinally of the machine in front of bed 2. The left end of feed shaft 16 is received within a gear box 17 and is connected through a suitable gear train 18, shown schematically in Fig. 1, to spindle 4.

A feed worm 19 is keyed to shaft 16 and passes through apron 11 and meshes with the free worm wheel portion 20 of a suitable clutch 21, the latter being mounted centrally on shaft 12. During rotation of feed shaft 16, clutch 21 is normally disengaged so that manual turning of turnstile 10 is necessary to move ram 8. However, when automatic forward feed of ram 8 is desired, a lever 22 keyed by a set screw 23 to a bushing 24 mounted on shaft 12 is moved upwardly to connect the latter to feed shaft 16 and drive ram 8 from motor 5. The inner annular end of bushing 24 is provided with a cam surface which, upon raising lever 22, engages a cam surface on the outer end portion of a cam ring 25, the latter being keyed to apron 11. This causes cam ring 25 to shift inwardly against a bearing 26, which in turn causes clutch 21 to be engaged.

An indexable turret 27 is mounted on the left end portion of ram 8 and is shown as having six faces on which different tools may be mounted in any desirable manner. Turret 27 is tightened to ram 8 by an annular channel clamp ring 28 which fits in suitable annular grooves in ram 8 and turret 27 adjacent the horizontal interface between the latter. Clamp ring 28 comprises two semicircular sections, two ends of which are securely joined adjacent the left forward corner of ram 8 by a threaded stud 29 or other suitable apparatus.

The other end of one of the clamp ring sections is provided with a pair of upper and lower outwardly extending spaced flanges 30. A link 31 is pivotally secured between the flanges by a vertical link pin 32 and extends outwardly therefrom. The other end of the other clamp ring section is provided with a centrally disposed outwardly extending flange 33. Flange 33 separates a pair of upper and lower links 34 which are pivotally secured to flange 33 by a vertical link pin 35 and extend outwardly therefrom. Link 31 is received between links 34 and the links are pivotally joined by the eccentric portion 36 of a rotatable shaft 37 which extends downwardly through ram 8 to adjacent the upper surfaces of saddle 6 between ways 9. A clamp lever 38 is disposed on the bottom end portion of shaft 37 and has a recess 39 therein which is adapted to receive an upwardly extending pin 40 secured to saddle 6 between ways 9 upon movement of ram 8 relative to the saddle. Clamp lever 38 is biased in a counterclockwise direction by a spring 41, and is limited in its counterclockwise movement by the rear wall of ram 8.

Normally, shaft 37 is positioned to provide a tight clamping action of clamp ring 28 to secure turret 27 to ram 8. However, under certain circumstances described hereinafter, shaft 37 is turned and eccentric portion 36 causes the linkage members 31 and 34 to loosen clamp ring 28 so that turret 27 may be indexed.

The underside of turret 27 is provided with a plurality of circumferentially spaced openings 42 which are adapted to selectively receive a vertically movable locking pin 43. Pin 43 extends downwardly from turret 27 through ram 8 to adjacent the lower side thereof. The lower end of pin 43 is pivotally connected through a suitable linkage 44 to one end of a generally longitudinally extending lever 45. Lever 45 is pivoted centrally on a transversely extending shaft 46 secured at both ends to ram 8. The other end of lever 45 extends toward the right end of the machine. Lever 45 is biased in a clockwise direction by a spring 47 wound on shaft 46 and held between the left end of lever 45 and a stop screw 48 extending inwardly from the forward wall of ram 8. Clockwise movement of lever 45 is limited by the possible upper extent of locking pin 43.

A tumbler member 49 is disposed in a central recess in the top surface of saddle 6 and is mounted for pivotal movement on a transverse stud 50. In its normal position, tumbler member 49 is disposed to have a cam surface 51 extending angularly upwardly and rightwardly from adjacent the top saddle surface. Cam surface 51 merges into a rightwardly extending horizontal surface 52, the latter terminating in a notch 53 which extends somewhat radially toward stud 50. In this position, member 49 is weighted so that it tends to pivot clockwise around stud 50. A stop member 54, which forms part of saddle 6, is disposed to be engaged by tumbler 49 under the clockwise force when surface 52 is horizontal.

Tumbler 49 cooperates with a projection 55 on the right end of lever 45 to release locking pin 43 from turret 27 in a manner to be described.

Automatic indexing of turret 27 during return movement of ram 8 is accomplished by the following mechanism. The upper surface of saddle 6 between ways 9 is provided with an upwardly extending projection 56. Projection 56 has a cutaway portion 57 adapted to receive one end of an index pawl 58, the latter being pivotally mounted on a vertical shaft 59 extending downwardly through projection 56. A spring 60 is secured to the lower end of shaft 59 and biases the latter and thus pawl 58 in a counterclockwise direction. Pivotal movement of pawl 58 is limited by a pin 61 which extends downwardly from the pawl and is received in a relatively larger circular opening 62 in projection 56. Normally, pin 61 is in engagement with the forward surface of opening 62, under the force exerted by spring 60.

The upper portion of pawl 58 is provided with a groove 63 having a left angular vertical surface 64. The end surface of pawl 58 defines a seat 65, which, together with surface 64 is adapted to be engaged by circumferentially spaced index pins 66 extending downwardly from the bottom of turret 27.

After a feed stroke of ram 8, the ram is retracted to the right to its initial position in preparation for the next operation. At the same time, it is usually desirable to index the turret to ready a new tool for presentation to the workpiece. The above described mechanism provides selective indexing of the turret simultaneously with retraction of the ram.

Assuming that ram 8 is being retracted after a feed stroke, the following sequence occurs near the end of ram travel.

Recess 39 in clamp lever 38 is engaged by pin 40, and as the ram continues its retraction, lever 38 is pivoted to turn shaft 37 and eccentric portion 36 to move links 31 and 34 and thereby loosen clamp ring 28 to release turret 27.

Almost simultaneously therewith, projection 55 rides upon cam surface 51 of tumbler 49, pivoting lever 45 to pull locking pin 43 out of one of the turret openings 42. Turret 27 is now free to rotate, and may be indexed manually if desired. As ram 8 continues its retraction, projection 55 will ride on horizontal surface 52 and eventually drop down adjacent notch 53, thereby leaving locking pin 43 free to move upwardly. In the meantime, turret 27 will have been indexed in a manner to be described, so that pin 43 may enter the next opening 42.

In addition, one index pin 66 engages the seat 65 of pawl 58, and is prevented from further longitudinal movement. As ram 8 continues its return movement, turret 27 will be indexed so that the next counterclockwise pin 66 will enter groove 63 and approach surface 64.

Once ram 8 has reached its final retracted position and turret 27 is indexed, forward feed of the ram may commence, producing the following sequence.

The first above-mentioned index pin 66 will move away from seat 65, and as the second pin 66 moves longitudinally it will engage surface 64 causing the latter to ride on the pin to pivot pawl 58 until the pin is released from groove 63. Pawl 58 is immediately returned to its normal position by spring 60.

Also, as ram 8 continues its forward feed motion, projection 55 will enter notch 53 of tumbler 49 and pivot the latter counterclockwise until projection 55 is released from the notch. At this point, tumbler 49 will have been pivoted against a horizontal leaf spring 67 mounted on saddle 6, and upon release of projection 55 the tension of spring 67 will help return tumbler 49 clockwise to its normal position in engagement with stop member 54.

In addition, pin 40 will rotate clamp lever 38 clockwise until shaft 37 and eccentric 36 are back in their original position, thus tightening clamp ring 28 and securing turret 27 to ram 8.

The mechanism within the housing of headstock 3 comprises, in general, a forward drive clutch 68, a reverse drive clutch 69, a high speed drive clutch 70, a low speed drive clutch 71 and three double gear shifter transmissions, designated as 72, 73 and 74 for driving spindle 4 at selectively different speeds. A brake 75 is mounted on spindle 4 and is actuated by fluid pressure to secure the same against rotation when the drive is in neutral.

The forward and reverse clutches 68 and 69 are connected between motor 5 and spindle 4 and are actuated hydraulically by fluid pressure in a manner to be described by a lever 76 mounted on the front of the headstock housing. Similarly, the high and low speed clutches 70 and 71 are connected between motor 5 and spindle 4 and may be actuated by a trip lever 77 and by other mechanisms to be described hereinafter. The gear shifter transmissions 72, 73 and 74 are controlled by the electrical system described hereinafter to provide different ranges of high and low speed.

Figure 2:
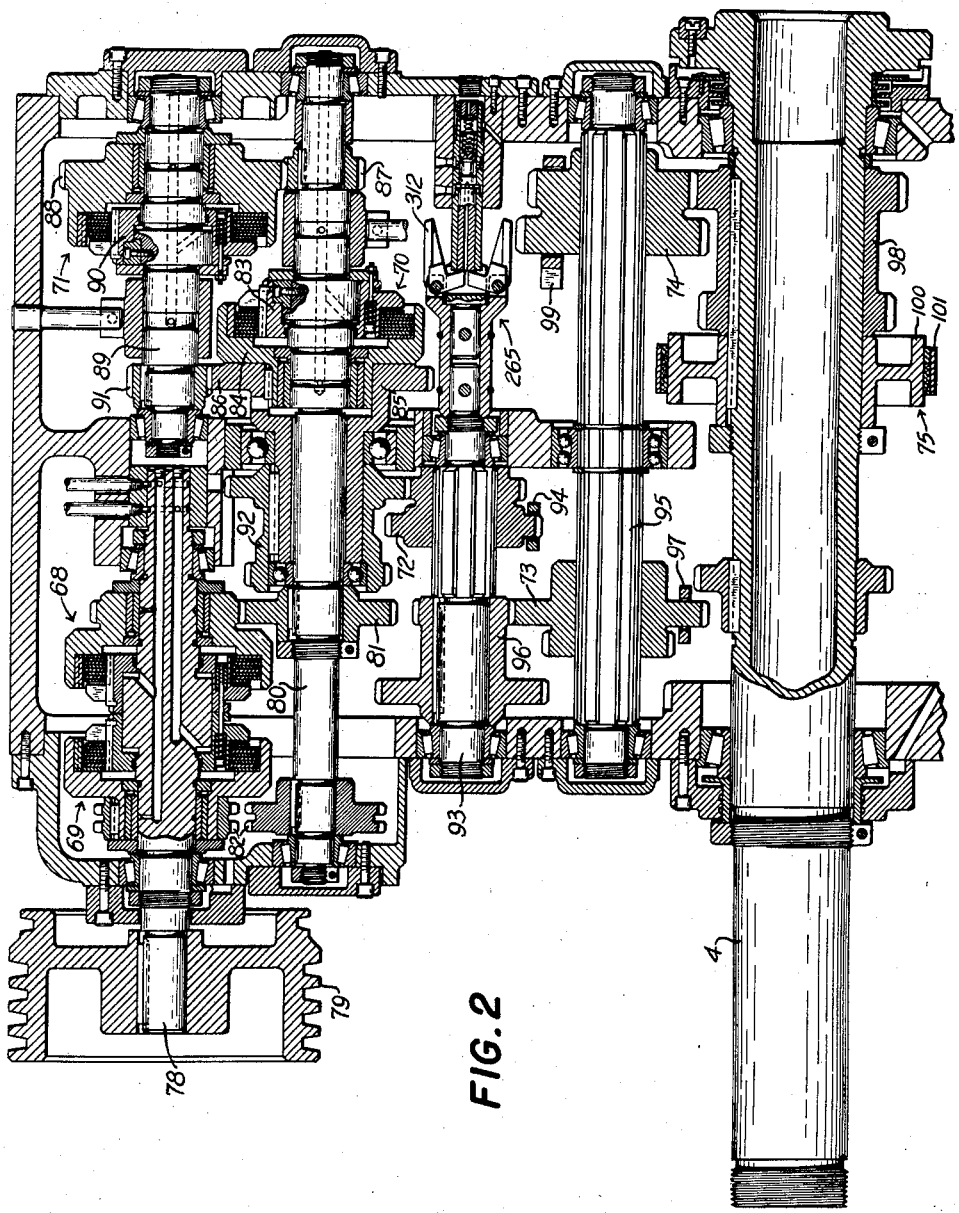
Fig. 2 is a developed longitudinal section of the headstock and showing the clutches and the brake mechanism.
Figure 5:
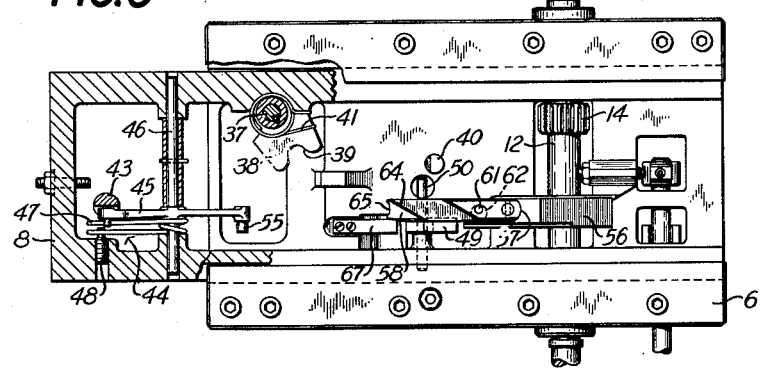
Fig. 5 is a top plan view of the saddle and ram with parts broken away and in section.
Figure 6:
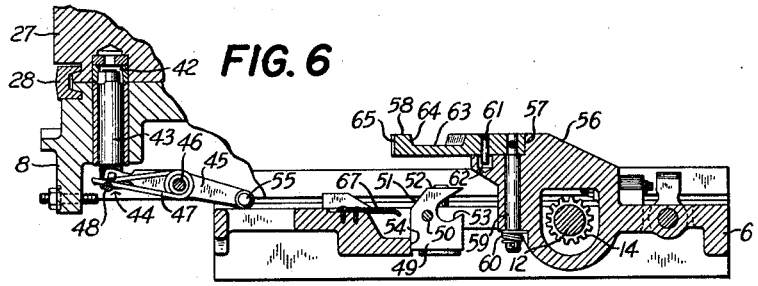
Fig. 6 is a vertical section of the saddle and ram with parts broken away and in section.

The arrangement and detailed construction of the clutches and gears in the headstock is relatively unimportant. As shown in Fig. 2, the drive shaft 78 is driven by an external pulley 79 from motor 5, and has the forward clutch 68 and reverse clutch 69 mounted thereon. Forward clutch 68 drives a shaft 80 in one direction through suitable gearing 81, while reverse clutch 69 drives shaft 80 in the opposite direction through suitable chain and sprocket gears 82. The clutches 68 and 69 are operated alternatively with a neutral position in which neither clutch is engaged.

The rotatably fixed member 83 of high speed clutch 70 is keyed to shaft 80, while the floating member 84 of clutch 70 is mounted on suitable bearings on shaft 80 and may rotate independently thereof. The rearward portion of member 84 is mounted within the forward portion of a sleeve 85 and is keyed thereto. Sleeve 85 has a gear 86 on its forward end and extends rearwardly from member 84 and is floatingly mounted on shaft 80. Engagement of clutch 70 will drive floating member 84 and sleeve 85 at the same speed and in the same direction as shaft 80.

A gear 87 is keyed to shaft 80 and engages the floating gear portion 88 of low speed clutch 71 mounted on a shaft 89. Shaft 89 is shown as mounted axially of drive shaft 78 and has the fixed member 90 of clutch 71 keyed thereto. Engagement of clutch 71 will rotate shaft 89 and drive gear 86 and sleeve 85 through a gear 91, keyed to shaft 89. The ratio of gear 87 to gear 88 and gear 91 to gear 86 is such to establish a substantial reduction in speed of rotation of sleeve 85 when low clutch 71 is engaged, relative to the speed of rotation of the sleeve when high speed clutch 70 is engaged.

The clutches 70 and 71 are operated alternatively to effect driving of sleeve 85 at either a high or low speed.

Sleeve 85 is provided with an extension 92 having a pair of concentrically mounted keyed gears of different size which are selectively engaged by the gears on double gear shifter transmission 72. Transmission 72 is mounted on the splined central portion of a shaft 93, and drives shaft 93 by meshing with the gears on extension 92. Shifter transmission 72 may be moved along the splined portion of shaft 93 to effect meshing of different gears, by means of a shifter shoe 94 which engages one of the gears thereon. Operation of shifter shoe 94 will be described more fully hereinafter.

Double gear shifter transmission 73 is mounted on a rotatable splined shaft 95 and is adapted to engage one of a pair of gears on a gear member 96 mounted rearwardly on shaft 93. Transmission 73 may be shifted along shaft 95 to effect meshing with one of the pair of gears on member 96 by means of a shifter shoe 97 which engages one of the pair in a manner to be described hereinafter. Rotation of shaft 93 is thus transmitted via gear member 96 and transmission 73 to shaft 95.

Double gear shifter transmission 74 is mounted on the forward portion of shaft 95 and is adapted to engage one of a pair of gears on a gear member 98 mounted forwardly on spindle 4 within headstock 3. Transmission 74 may be shifted along shaft 95 to effect meshing with one of a pair of gears on member 98 by means of a shifter shoe 99 which engages one of the pair in a manner to be described hereinafter. Rotation of shaft 95 is thus transmitted via transmission 74 and gear member 98 to spindle 4.

Spindle 4 is mounted in suitable bearings in the headstock casing and carries the brake 75 which comprises a brake drum 100 encircled by a brake band 101. Brake band 101 is tightened upon drum 100 by means of a piston 102 mounted in a power cylinder 103, and is loosened upon drum 100 by means of a spring 104 which opposes movement of the piston under the influence of fluid pressure in the cylinder.

As best seen in Figs. 11–14 of the drawings, the hydraulic control mechanism for the headstock 3 includes a pump 105 which supplies oil or other hydraulic fluid under constant pressure through a line 106 to a plurality of selected valves, to be described hereinafter. A reservoir or sump 107 is disposed within headstock 3 and supplies fluid to pump 105 through a line 108. Sump 107 receives fluid from the drain ports of certain selected valves either through a line 109 or by the fluid falling down to the sump directly from the valve.

Hereinafter, when it is stated that a certain valve port receives fluid under constant pressure, it will be clear that the fluid is supplied through line 106 from pump 105. Likewise, when it is stated that a certain valve port is connected to drain, it will be clear that fluid in the port will flow to sump 107 either through line 109 or by direct gravity fall through the headstock.

The hydraulic control mechanism for operating forward and reverse clutches 68 and 69 and brake 75 includes, in general: a forward and reverse pilot valve 110, a pressure regulator pilot valve 111, a clutch control valve 112, a free spindle valve 113, a brake pilot valve 114 and an inching valve 115.

Forward and reverse pilot valve 110 is disposed in a valve housing 116 and comprises a spool-type piston 117 adapted to reciprocate within the housing and normally biased in a downward position by a spring 118, as shown in Fig. 12.

A port 119 in housing 116 connects a centrally disposed circumferential groove in piston 117 with a centrally disposed circumferential groove in a spool-type piston 120 of pressure regulator pilot valve 111, also disposed in housing 116. Piston 120 is adapted to reciprocate in housing 116, and is normally biased upwardly by a spring 121. A port 122 in housing 116 receives fluid under constant pressure and carries it to the groove in piston 120, the fluid passing hence through port 119 to the groove in piston 117. The fluid passes from valve 110 to a port 123 in housing 116, and then through a line 124 and into port 125 of clutch control valve 112.

Valve 112 selectively conducts fluid under normally constant pressure from pump 105 to brake 75 and clutches 68 and 69, and comprises a spool-type valve stem 126 disposed to reciprocate within a suitable sleeve or housing 127. The right end portion of valve stem 126 extends beyond housing 127 and is secured to forward-reverse lever 76.

The left end portion of valve stem 126 extends outwardly beyond housing 127 to adjacent a high speed reversing safety lock valve 128, the functioning and purpose of which will be described hereinafter.

In its neutral position, shown in Fig. 14, valve 112 admits fluid at port 125 which passes around a circumferential groove in valve stem 126 and out through a port 129 in housing 127. Port 129 connects with a port 130 in the housing 131 of free spindle valve 113. A spool-type valve stem 132 is adapted to reciprocate in housing 131 and normally is disposed to the left as shown in Fig. 14. Fluid passing in through port 130 passes around a circumferential groove in valve stem 132 and hence through a port 133 in housing 131 to a line 134 which leads to a port 135 in brake pilot valve 114.

Valve 114 is connected between valve 112 and brake 75 and comprises a suitable housing 136 having a spool-type piston 137 adapted to reciprocate therein and normally biased downwardly by a spring 138. Fluid passing in through port 135 passes through a chamber formed by piston 137 and then outwardly to a port 139 and through a line 140 to a port 141 in inching valve 115.

Valve 115 is manually operable and is connected between valves 112 and brake 75 and clutch 68. Valve 115 comprises a suitable housing 142 having a spool-type valve stem 143 disposed for reciprocating movement therein. The upper end portion of valve stem 143 extends above housing 142 and has a spring 144 disposed circumferentially therearound which biases valve stem 143 upwardly. A suitable spool 145 is secured to valve stem 143 at the lower end thereof outside housing 142, spool 145 being connected to an inching lever 146 mounted on head stock 3.

Inching valve 115 remains in its normal position shown in Fig. 14, i.e., opened between valve 112 and brake 75, except during a spindle inching operation which is described more fully in my above identified copending application.

Fluid from line 140 enters port 141 of valve 115 and passes through a chamber formed by valve stem 143 and then outwardly through a port 147 and through a line 148 to a port 149 leading to piston 102 in brake cylinder 103, opposing the action of spring 104 to apply the brake.

At the same time, a port 150 in clutch control valve 112 will be connected through a longitudinal passage 151 in valve stem 126 and through a port 152 and a line 153 to cascade 154. Port 150 leads from valve 112 through a line 155 to a port 156 in inching valve 115 and hence through a chamber formed by valve stem 143 to a port 157 and then through a line 158 to a port 159 in a reversing valve 160, the purpose of which will be described hereinafter. When the spool-type valve stem 161 of valve 160 is in its normal or up position, fluid will pass from port 159 to a port 162 and hence through a line 163 to a port 164 in forward clutch 68.

In addition, a port 165 in clutch control valve 112 is similarly connected to cascade 154 through port 152 and line 153. Port 165 leads from valve 112 through a line 166 to a port 167 in reversing valve 160. When valve stem 161 is in its normal position, fluid will pass from port 167 to a port 168 and hence through a line 169 to a port 170 in reverse clutch 69.

Cascade 154 is disposed within headstock 3 and above the various clutches and gears and provides a spray of fluid to lubricate the same.

It will be seen that when valve 112 is in neutral position, clutches 68 and 69 will normally be disengaged and brake 75 will normally be applied to prevent rotation of spindle 4. A port 171 in valve 112 and connected to line 124 is blocked off by valve stem 126.

When it is desired to start rotation of spindle 4 in a forward direction, lever 76 is shifted from the neutral or central position to the right or forward position. This shifts valve stem 126 to the right so that fluid entering port 125 from line 124 is connected through a drain hole 172 in valve stem 126 to passage 151 and hence through port 152 and line 153 to cascade 154.

The fluid between ports 130 and 133 and brake piston 102, described above, will also be connected through hole 172 to cascade 154, thereby allowing spring 104 to push piston 102 upwardly and release the spindle brake.

Fluid passing in port 171 from line 124 will now be connected through the chamber formed by valve stem 126 to port 150 and hence through line 155 and through ports 156 and 157 of inching valve 115, through lines 158 and 163 and port 164 to engage forward clutch 68. Port 165 in clutch control valve 112 remains open to drain, assuring that reverse clutch 69 will continue to be disengaged.

When it is desired to start rotation of spindle 4 in a reverse direction, lever 76 is shifted to the left or reverse position. This shifts valve stem 126 to the left. Fluid entering port 125 is again connected to passage 151 through a drain hole 173 in valve stem 126 and passes on through port 152 and line 153 to cascade 154. Brake port 149 will again be connected to the cascade through inching valve 115, ports 130 and 133 and hole 173, so that brake 75 will be released.

Fluid passing in port 171 from line 124 will now be connected through a chamber formed by valve stem 126 to port 165 and hence through lines 166 and 169 to port 170 in reverse clutch 69 to engage the clutch for reverse rotation of spindle 4.

Port 150 in valve 112 will again be connected to cascade 154 through passage 151, port 152 and line 153, so that forward clutch 68 will be disengaged.

It will thus be seen that when valve 112 is in a position other than neutral, i.e. the forward or reverse spindle drive position, the respective forward or reverse clutch 68 or 69 will normally be engaged and brake 75 will normally be automatically disengaged.

The hydraulic control mechansm for operating high and low clutches 70 and 71 includes, in general: a high-low clutch pilot valve 174, a distributor timer valve 175, a speed selector valve unit 176, and a high-low pilot valve 177.

High-low clutch pilot valve 174 is connected between various valves and clutches 70 and 71 and comprises a suitable housing 178 and a spool-type piston 179 adapted to reciprocate within the housing. When piston 179 is positioned to the left, a port 180 in housing 178 will connect through a chamber formed by piston 179 to a port 181 which leads through line 153 to cascade 154. Port 180 leads through a line 182 leading to port 183 in low clutch 71.

At the same time, fluid may enter a port 184 in housing 178 and pass through a chamber formed by piston 179 to a port 185 which connects through a line 186 to a port 187 in high speed clutch 70. Fluid enters port 184 from a line 188 which leads from a port 189 in high-low pilot valve 177.

Valve 177 is connected between pump 105 and valve 174 and comprises a piston 190 disposed to reciprocate within housing 116 and normally biased downwardly by a spring 191. In its normal position, valve 177 admits constant pressure fluid through a port 192, the fluid passing around the groove formed by piston 190 and to port 189 and hence to port 184 in high-low clutch pilot valve 174. During a cycle, described hereinafter, valve 177 prevents the flow of fluid to the selectively engaged clutch 70 or 71 when brake 75 is engaged.

When piston 179 is to the left, low clutch 71 will thus be disengaged and high clutch 70 may be engaged.

Figure 13:
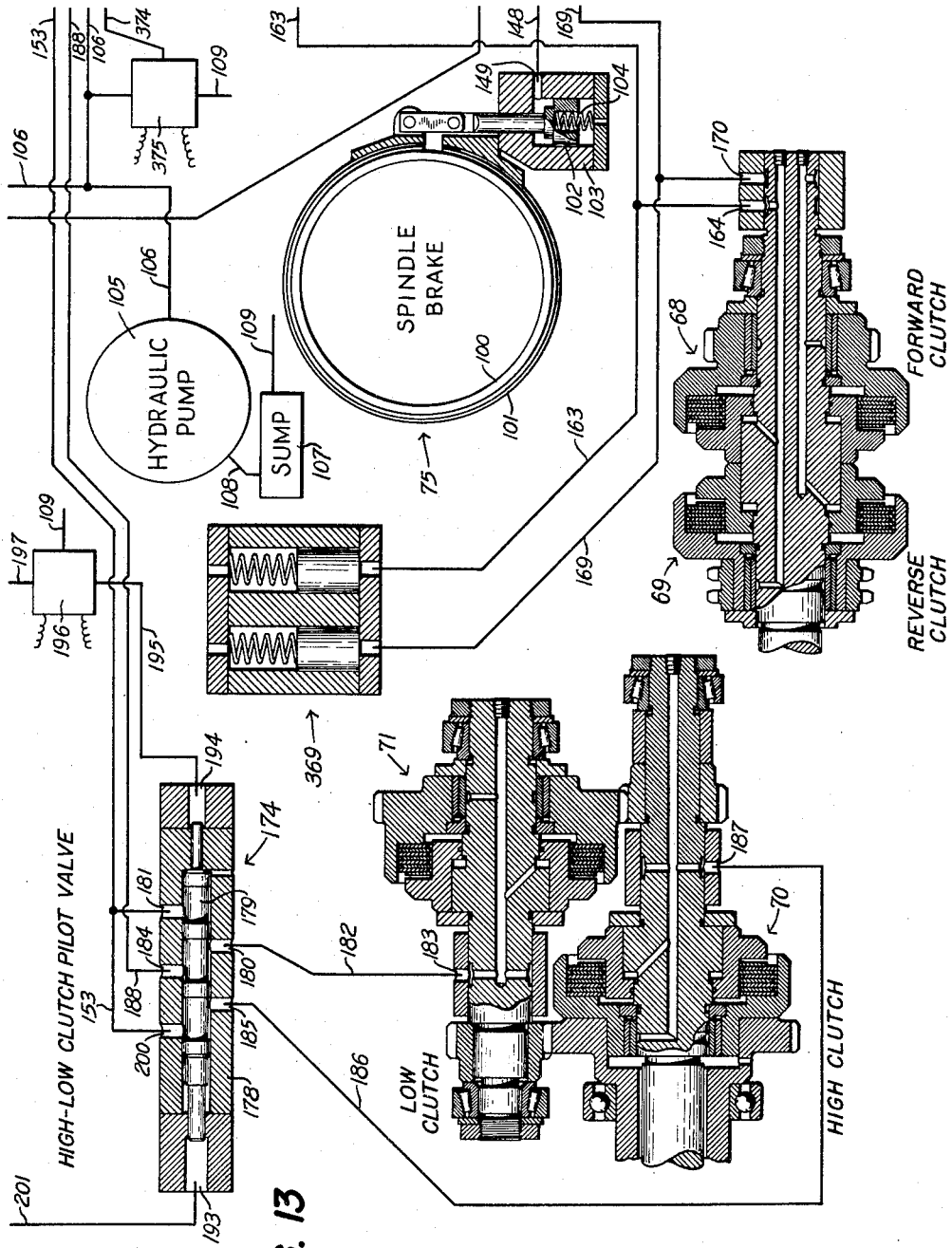
Fig. 13 is a diagrammatic view of the left lower portion of the hydraulic system.

When high speed clutch 70 is to be disengaged by the action of valve 174, fluid enters a port 193 to push piston 179 to the right as shown in Fig. 13. Fluid behind or to the right of piston 179 will pass through a port 194 and hence through a line 195 to a solenoid valve 196, the latter being held closed in a manner to be described when low speed is desired. Under these conditions, fluid passing through solenoid valve 196 from port 194 will be connected to drain line 109, and a line 197 between solenoid valve 196 and a port 198 in the housing 199 of distributor timer valve 175 will be blocked by valve 196. When piston 179 moves to the right, fluid in high clutch 70 is connected from port 187 through line 186 to port 185 in valve 174, and hence through a groove formed by piston 179 through a port 200 and through line 153 to cascade 154. At the same time, fluid may enter port 184 and pass through a groove formed by piston 179 to port 180, line 182, and port 183 in low speed clutch 71 to engage the clutch.

Fluid enters port 193 in valve 174 through a line 201 which connects with a port 202 in the housing 199 of distributor timer valve 175. Port 202 is connected to a source of fluid pressure through a groove formed by the piston 203 of valve 175, under certain conditions described hereinafter.

To provide engagement of high speed clutch 70 from the disengaged position, fluid will pass through line 197 from port 198 under conditions to be described, and solenoid valve 196 will be opened, as will be described, to permit fluid to pass from line 197 through line 195 to port 194 of valve 174, solenoid 196 blocking off drain line 109. Port 193 will be connected to drain towards the end of the speed change cycle, as will be described.

It can thus be seen that when piston 179 is positioned to the left, low clutch 71 will be connected to cascade 154 and disengaged, and high clutch 70 will be engaged if fluid is passing in through port 184. When piston 179 is positioned to the right, high clutch 70 will be connected to cascade 154 and disengaged, and low clutch 71 will be engaged if fluid is passing in through port 184.

In some instances, as where it is desirable that neither high nor low clutches 70 and 71 be engaged, fluid is prevented from entering port 184. This is accomplished under conditions described hereinafter by fluid passing from a port 204 in distributor timer valve 175 and through a line 205 to a port 206 in high-low pilot valve 177. Fluid passing in port 206 pushes piston 190 upwardly against the force of spring 191 and cuts off the constant pressure fluid normally flowing from port 192 to port 189 and hence to port 184 in valve 174.

Gear shifter transmissions 72, 73 and 74 are adapted to be moved along their respective shafts by shifter shoes 94, 97 and 99, respectively which engage the transmission. Shifting of transmission 72 provides engagement with one or the other of the pair of gears on extension 92 of sleeve 85, shifting of transmission 73 provides engagement with one or the other of a pair of gears on member 96 on shaft 93, and shifting of transmission 74 provides engagement with one or the other of the pair of gears on member 98 on spindle 4 for rotatably driving the latter.

Shoes 94, 97, and 99 are moved to effect shifting of their respective transmissions by gear shifter units 207, 208 and 209, respectively. Shoes 94 are secured to the outer extremity of a piston 210 which is adapted to reciprocate in a housing 211, shoe 97 is secured to the outer extremity of a piston 212 which is adapted to reciprocate in a housing 213, and shoe 99 is connected to the outer extremity of a piston 214 which is adapted to reciprocate in a housing 215. Shoe 99 extends downwardly from piston 214, as shown in Fig. 11, and is slidably connected to an axially outwardly extending rod portion of the primary piston 216 of a free spindle pilot valve 217 which operates in conjunction with free spindle valve 113.

The gear shifter units are actuated hydraulically by the operation of valve 175 to provide sixteen different spindle speeds selectively controlled by speed selector valve unit 176. Valve unit 176 is connected between distributor timer valve 175 and units 207, 208 and 209 and comprises a suitable housing 218 having three spaced spool-type pistons 219, 220 and 221 respectively, disposed for reciprocating movement therein. As shown in Fig. 11, pistons 219, 220 and 221 are normally biased upwardly by springs 222, 223 and 224 respectively, with each piston having a central passageway 225, 226, and 227 respectively, which connects two grooves in the piston with a pressure relief drain port 228, 229 and 230 respectively in the lower portion of housing 218.

Pistons 219, 220 and 221 provide three speed selector pilot valves and are connected by a common port 231 to line 197 which provides the hydraulically controlled inlet from distributor timber valve 175. When piston 219 is in its normal position, and when valve 175 goes through a speed change cycle, described hereinafter, fluid will pass from port 198 through line 197 and port 231, around a groove in piston 219 to a port 232 in housing 218, and hence through a line 233 to a port 234 adjacent the left end portion of gear shifter unit 207. At the same time fluid in the right end portion of unit 207 will be open through a port 235, a line 236 and a port 237 in housing 218 to passageway 225 and hence to drain port 228. Piston 210 will thus be at the right, as shown in Fig. 11.

In like manner, fluid will pass from common port 231 around a groove in piston 220 to a port 238 in housing 218, and hence through a line 239 to a port 240 adjacent the right end portion of gear shifter unit 208. At the same time, fluid in the left end portion of unit 208 will be open through a port 241, a line 242 and a port 243 in housing 218 to passageway 226 and hence to drain port 229. Piston 212 will thus be at the left.

Similarly, fluid will pass from common port 231 around a groove in piston 221 to a port 244 in housing 218, and hence through a line 245 to a port 246 adjacent the right end portion of gear shifter unit 209. At the same time, fluid in the left end portion of unit 209 will be open through a port 247, a line 248 and a port 249 in housing 218 to passageway 227 and hence to drain port 230. Piston 214 will thus be at the left.

The arrangement of speed selector valve unit 176 and of gear shifter units 207, 208 and 209 shown in Fig. 11 indicates transmission settings entirely in the low speed group when high low clutch pilot valve piston 179 is to the right. Other settings of pistons 219, 220 and 221 are necessary to produce the fifteen other possible spindle speeds obtainable with the apparatus. This is accomplished by electrically actuated solenoid valves 250, 251 and 252 which are connected through hydraulic lines 253, 254 and 255 respectively to ports 256, 257 and 258 disposed in housing 218 above pistons 219, 220 and 221 respectively.

Each solenoid valve is hydraulically connected to constant pressure line 106, and each solenoid is provided with a hydraulic connection to drain line 109. Solenoid valves 250, 251 and 252 are normally closed, but are selectively opened electrically in a manner to be described to permit constant pressure fluid to pass from line 106 to ports 256, 257 and 258 to push the respective pistons downwardly against the force of springs 222, 223 and 224. Under these conditions, fluid passing in port 231 will be routed to ports 235, 241 and 247 in the gear shifter units and ports 234, 240 and 246 will be open to drain through passageways 225, 226 and 227.

When the solenoid valves 250, 251 and 252 are again de-energized, springs 222, 223 and 224 will push the respective pistons upwardly again, and fluid in lines 253, 254 and 255 will pass back through the solenoids to drain line 109. Pressure from line 106 will be blocked off.

The hydraulic control system for producing the automatic gear change cycle includes distributor timer valve 175, as well as direct-preset valve 259, draining valve 260, pressure regulating valve, shut-off valve 262, distributor pilot valve 263, high-low shock valve 264 and governor 265.

The distributor timer valve 175 is the heart of the automatic gear change control, and is actuated by fluid pressure to produce an hydraulic cycle for shifting the transmission gears to change the spindle speed. Valve 175 is connected to constant pressure line 106 through a port 266 disposed at the left of piston 203. The normal position of valve 175 is shown in Fig. 11. In this position, ports 202, 204 and 267 are connected to drain through a longitudinal opening in piston 203 and a port 268 in housing 199. A port 269 is connected to drain through a separate port 270. Port 198 is connected to port 269 through an extension of line 197 and thus is also connected to drain through port 270. A port 271 is connected to port 198 through a groove in piston 203, and is therefore also connected to drain through port 270.

Since port 202 is connected to drain, port 193 in high-low clutch pilot valve 174 is connected to drain through line 201, and a port 272 in pressure regulator pilot valve 111 is also connected to drain through line 201 so that the valve piston 120 is in its normal position, i.e., biased upwardly by the spring 121 in housing 116. Valve 111 is disposed in an hydraulic line between pump 105 and clutches 68 and 69 and is normally open therebetween.

Since port 204 in valve 175 is connected to drain, a port 273 in the lower end portion of brake pilot valve 114 is connected to drain through line 205 so that the valve piston 137 will be in its normal downwardly biased position. A port 274 in the lower portion of forward and reverse pilot valve 110 is also connected through line 205 to the valve 175 and to drain so that the valve piston 117 will be in its normally downwardly biased position. In addition, port 206 in high-low pilot valve 177 is connected to drain through line 205 so that valve piston 190 is in its normally downwardly biased position. Port 204 also leads through line 205 to a port 275 in the housing 276 of high-low shock valve 264. Since port 204 is connected to drain, the piston 277 in valve 264 will be in its upward position, shown in Fig. 12, at low spindle speeds.

Since port 267 is connected to drain, a port 278 in the lower portion of shut-off valve 262 will be connected to drain through a line 279. In addition, a port 280 in distributor pilot valve 263 and disposed adjacent the upper end of the valve piston 281 in housing 116, will be connected to drain through line 279, so that piston 281 will be at its upward position, shown in Fig. 12, at relatively low spindle speeds as determined by governor 265, to be described.

Since ports 198 and 269 are connected to drain, there will be no action of valve 174 or of valve 176 when piston 203 is in the left-most position, regardless of whether solenoids 250, 251 and 252 are in the open or closed position.

Port 271 connects through a line 282 to a port 283 in the upper portion of shut-off valve 262, thereby draining the chamber above the valve piston 284. In the normal position of valve 262, shown in Fig. 12, constant pressure fluid entering at a port 285 will be blocked by piston 284.

Fluid in a line 286 between a port 287 in valve 175 and a port 288 in shut-off valve 262 is blocked by pistons 203 and 284, respectively.

A port 289 is disposed slightly inwardly from the right end portion of valve housing 199, and connects through a line 290 to a port 291 in valve 264. Fluid in line 290 will be blocked off by piston 277 in valve 264 at relatively low spindle speeds as determined by governor 265.

A port 292 is disposed adjacent the right end portion of the piston chamber of housing 199 and connects through a line 293 to a port 294 adjacent the upper portion of direct-preset valve 259. Valve 259 includes a cam 295 adapted to selectively seat or unseat a spring-pressed ball 296 to either allow fluid to pass from port 294 to a port 297 in housing 116 or to block fluid off. Cam 295 is connected to a preset lever 298 mounted on headstock 3. When lever 298 is in the "preset" position, cam 295 will be turned so ball 296 is seated, preventing fluid from passing from port 294 to port 297. When lever 298 is in the "direct" position, cam 295 will be turned so ball 296 is unseated, allowing fluid to pass from port 294 to port 297.

It will be assumed that lever 298 is in the "direct" position. Port 297 connects through a line 299 to a port 300 in draining valve 260. Valve 260 is operated to initiate the hydraulic cycle and is connected to valve 175. Valve 260 comprises a suitable housing 301 having a valve stem 302 adapted to reciprocate therein and normally biased downwardly by a spring 303 disposed in the housing.

Housing 301 is provided with a centrally located drain port 304 which connects with line 109, and also has a port 305 connecting the lower end of valve stem 302 through a line 306 to a solenoid valve 307 which is connected between constant pressure line 106 and drain line 109.

When solenoid valve 307 is de-energized, fluid from line 106 will be blocked off and valve stem 302 will be in its normal downward position. Port 300 will be blocked, thereby preventing passage of fluid from port 292 in valve 175 through valve 259 to valve 260. Energization of solenoid valve 307 and its effect on valve 260 will be described hereinafter.

Port 292, disposed adjacent the right end portion of the piston chamber of housing 199, also connects through a line 308 to a port 309 in valve 263 which has a timer plug 310 disposed therein to restrict passage of fluid from port 309 to port 292.

When piston 281 of distributor pilot valve 263 is in its upward position, fluid under constant pressure will enter the valve at a port 311 and connect through a groove formed by the piston to port 309 and hence to port 292, passing through plug 310, to hold piston 203 at its leftmost or normal position.

Governor 265 is mounted adjacent the right end portion of shaft 93 within headstock 3, and rotates simultaneously with spindle 4. The governor comprises a pair of wings 312 secured to the end of the shaft and which are in closed position when spindle 4 is not turning and which gradually open as the speed of the spindle increases. The inner portion of wings 312 are engaged by the outer end of a spool-type valve stem 313 which is biased against the wings by a spring 314 mounted in a suitable sleeve disposed within the valve housing 315. Opening of the wings moves valve stem 313 rearwardly against spring 314.

Housing 315 has a port 316 therein which connects to constant pressure line 106. A second port 317 connects through a line 318 to a port 319 in the lower end portion of high-low shock valve 264 and also to a port 320 in the lower end portion of distributor pilot valve 263. When spindle 4 is rotated at one of the eight low speeds, wings 312 will be only partially opened and valve stem 313 will be disposed to connect port 317 with port 316, so that fluid will enter ports 319 and 320 to push pistons 277 and 281 to an upward position. When spindle 4 is rotating at one of the eight high speeds, wings 312 will be relatively further open and valve stem 313 will be disposed to block constant pressure fluid coming in port 316 and to open port 317 to drain through a passage 321 in valve stem 313. This will drain ports 319 and 320 in valves 264 and 263, and pistons 277 and 281 will either remain stationary or move downwardly, depending on whether fluid is entering ports 275 and 280.

Line 318 also connects port 317 with a port 322, in high speed reversing safety lock 128 which is controlled by the governor and disposed adjacent valve 112. Lock 128 is designed to prevent the operator from moving forward-reverse lever 76 from the forward to the reverse position when spindle 4 is moving at high speed. The safety lock 128 is actuated by fluid pressure and includes a latch member 323 secured to a housing and which is engaged by a biasing spring 324 and a piston 325 disposed within the housing. At high speeds, port 317 and thus port 322 are connected to drain, allowing spring 324 to bias latch 323 to a position behind clutch control valve stem 126, thereby preventing movement of valve stem 126 to the left or reverse position. At low speeds, ports 317 and 322 receive fluid under constant pressure from port 316 so that piston 325 pushes latch 323 out of the way of valve stem 126 to allow leftward movement of the latter.

Pressure regulating valve 261 comprises a passage 326 disposed vertically in housing 116 and having a ball check 327 disposed adjacent the upper end thereof and a similar ball check 328 adjacent the lower end thereof.

When pressure regulator pilot valve 111 is in its normal position, constant pressure fluid will pass in port 122 and through port 119 to valve 110 and hence to valve 112 and either the forward or reverse clutch, as described above. At the same time, port 119 connects with a port 329 which leads from valve 111 to above ball check 328. Fluid in port 329 is blocked by ball check 327.

During a gear change, to be described hereinafter, fluid passes from port 202 in distributor timer valve 175 and through line 201 to port 272 in pressure regulator pilot valve 111, pushing piston 120 downwardly and blocking off the constant pressure fluid entering at port 122. At the same time, fluid passing in port 272 will pass through a restriction member 330 in the upper end of piston 120 and will pass through a longitudinal passage therein to a port 331, which connects centrally with passage 326. This fluid will pass upwardly through ball check 327 and hence through ports 329 and 119 and on to clutch control valve 112. At the same time, fluid may also pass downwardly through ball check 328 to a port 332 which leads to drain, thus bleeding off some of the constant pressure fluid to reduce the pressure going to the forward and reverse clutches. The amount of reduced pressure incident on the clutches 68 and 69 may be regulated by adjusting the tension of the spring of ball check 328.

Valve 261 provides a by-pass for valve 111 when the latter is actuated by operation of valve 175.

Solenoid valves 196, 250, 251, 252 and 307 are selectively energized or de-energized by an electrical system responsive to indexing of turret 27. The lower axial portion of the turret is provided with a bevel gear 333 which is in meshing engagement with a bevel gear 334 fixedly mounted on the inner end portion of a longitudinally extending rotatable shaft 335. Shaft 335 extends through ram 8 and the outer end thereof is secured in any suitable manner to a hub member 336 which is rotatably mounted on the end of ram 8. Hub 336 is provided with an outwardly extending annular surface, and the inner end of an indexable control member, such as a cylindrical drum 337, is overlappingly secured to the surface by a plurality of circumferentially spaced screws 338. If desired, screws 338 may be utilized to adjustingly secure suitable longitudinally extending stop screws 339 in hub 336.

Indexing of turret 27 will thus impart a corresponding indexing of drum 337.

Drum 337 is provided with a plurality of solenoid control stations, indicated generally as 340, 341, 342, 343, 344 and 345. Each station is spaced axially from the adjacent station and comprises a plurality of circumferentially spaced threaded openings. The openings for stations 340, 341, 342, 344 and 345 are disposed in six axially extending circumferentially spaced rows, corresponding to the six faces on turret 27, and are adapted to receive trip buttons 346 therein. If a turret with other than six faces is utilized, the number of rows will be increased or decreased to correspond therewith. The openings for station 343 are disposed between the above mentioned rows, and are adapted to selectively secure actuating cams 347 by suitable screws. Each cam 347 extends circumferentially partially around the surface of drum 337 and is disposed entirely between adjacent rows of openings.

Suitable microswitches 348, 349, 350, 351, 352 and 353 are mounted on ram 8 and are provided with roller actuated plungers which are selectively engaged by trip buttons 346, or, in the case of switch 351 by cams 347, to operate the respective switch. Any other suitable type of switch mechanism may be utilized for this purpose.

Figure 10:
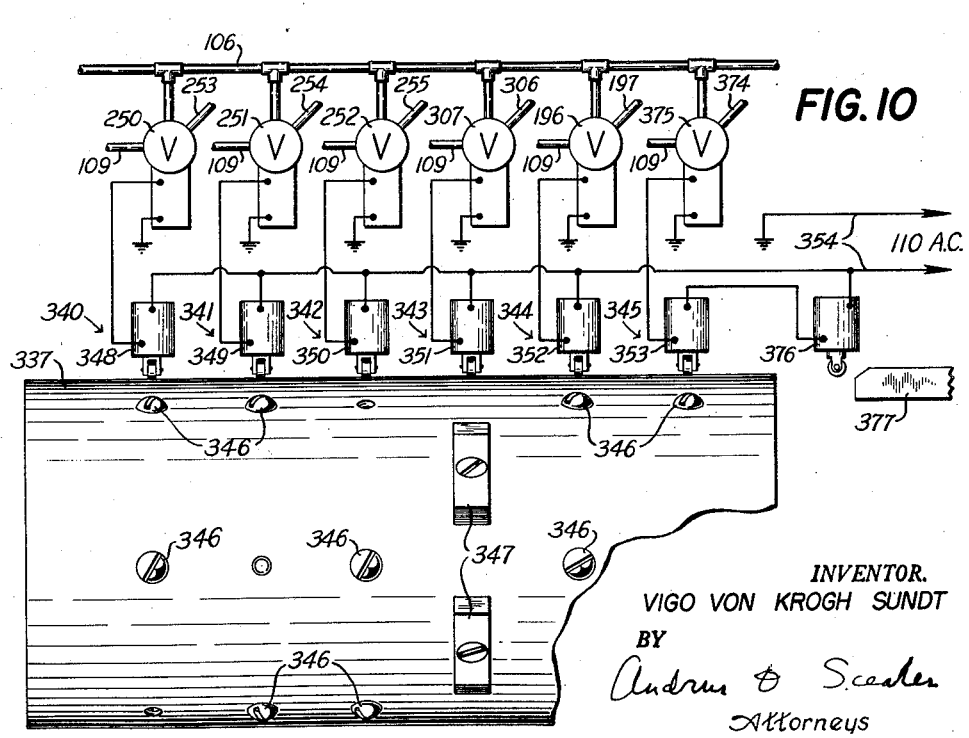
Fig. 10 is a view showing the control drum, the electrical circuit and part of the hydraulic circuit.

As shown in Fig. 10, switches 348 through 352 are electrically connected in series with the windings of solenoid valves 250, 251, 252, 307 and 196 respectively, and are adapted to selectively actuate the latter in response to movement of the microswitch plungers as drum 337 is rotated during indexing of turret 27. The pairs of related switches and solenoid valves are connected in parallel across common power lines 354 receiving current from a suitable A.C. current source, not shown.

For purposes of describing the operation of the apparatus, it will be assumed that ram 8 has been fed forward and that machining of a workpiece with a tool mounted on one face of the turret has just been completed. The spindle is rotating at high forward speed. At this point, valves 110, 111, 113, 114, 115, 175, 177 and 260 will be in their normal or neutral positions. Clutch control valve 112 is in the forward position, i.e. to the right. High-low clutch pilot valve 174 is in the left or high position, indicating that solenoid valve 196 is in its normally open position and the plunger of microswitch 352 is not contacting any trip button 346 on station 344. The pistons 219, 220 and 221 of speed selector valve unit 176 are in any one of the eight positional combinations to produce high speed positioning of gear shifter units 207, 208 and 209. Direct preset valve 259 is in the "direct" position. Shut-off valve 262 is in its downward position, and distributor pilot valve 263 and high-low shock valve 264 are in their upward positions. Wings 312 of governor 265 will be open to their wider position. The microswitches will be disposed adjacent one row of openings on drum 337.

It is next desirable to present a different tool to the same workpiece, such as for a finish cut. This requires a different spindle speed than was previously used. It will be assumed that the new spindle speed will also be in the high speed group.

Turnstile 10 is turned to move ram 8 and return the latter to its initial retracted position. As ram 8 approaches the end of its rearward movement, turret 27 will be automatically unclamped and indexed as has been previously described, simultaneously turning shaft 335 and thus indexing drum 337.

As drum 337 indexes, microswitches 348, 349 350 and 352 will all be open, since there are no trip buttons 346 between the axial rows. Continued indexing of drum 337 will cause the plunger of microswitch 351 to ride up on a cam 347 placed on the drum on station 343. Microswitch 351 will close, energizing solenoid valve 307 so that constant pressure fluid passes through the latter to port 305 to push valve stem 302 upwardly. This will connect port 300 to drain port 304. This drains port 292 behind or to the right of piston 203 of distributor timer valve 175, allowing fluid entering at port 266 to push piston 203 to the right.

As piston 203 moves to the right, it first uncovers port 202, allowing fluid to pass therethrough and:

(a) Through line 201 to a port 355 in gear shifter unit 209, which disengages a gear lock piston 356 from one of a pair of slots 357 in piston 214 to unlock gear shifter unit 209 for subsequent movement;

(b) Through line 201 to port 193 in high-low clutch pilot valve 174 pushing piston 179 to the right to disengage high clutch 70 and engage low clutch 71;

(c) Through line 201 to port 272 in pressure regulator pilot valve 111, blocking off constant pressure fluid entering at port 122 but allowing a reduced presure to pass from port 123 in forward reverse pilot valve 110 to forward clutch 68 to produce a slight drag on the latter to allow the transmission gears to rotate slowly and slide into the respective gears on the various shafts in the headstock to prevent clashing of the transmission gears subsequently during a gear change.

As piston 203 moves further to the right, it uncovers port 204, allowing fluid to pass therethrough and:

(a) Through line 205 to port 275 in the high-low shock valve 264, moving piston 277 downwardly and opening port 291 and therefore port 289 in valve 175 to drain. This has no effect on the gear change cycle;

(b) Through line 205 to port 273 in brake pilot valve 114, pushing piston 137 upwardly against the force of spring 138. The fluid will pass behind the piston and through a restriction member 358 and hence through a passageway in the piston to a port 359. Port 359 connects with line 140 so that the pressure fluid will pass through inching valve 115 to brake 75 and apply the brake to slow down the spindle. Ports 135 and 139 in valve 114 are blocked off by piston 137;

(c) Through line 205 to port 206 in high-low pilot valve 177, pushing piston 190 upwardly against spring 191. This will block constant pressure entering at port 192 and will open port 189 to drain through a passageway 360 in piston 190. Low speed clutch 71 is thus disengaged when the spindle brake is applied to prevent dragging of the clutch. The change from high speed clutch 70 to low clutch 71, described previously, occurs only a moment prior to the engagement of brake 75 and disengagement of clutch 71, since piston 203 normally makes a complete cycle in a matter of seconds;

(d) Through line 205 to port 274 in forward and reverse pilot valve 110, pushing the piston 117 upwardly against spring 118. This blocks fluid passing from pump 105 through port 119 and opens port 123 to drain through a passageway 361 in piston 117. Forward clutch 68 will be disengaged thereby.

As piston 203 moves farther to the right, it reaches the end of its stroke and uncovers port 267, allowing fluid to pass therethrough and:

(a) Through line 279 to port 280 in distributor pilot valve 263, pushing piston 281 downwardly and opening port 309 and thus port 292 in valve 175 to drain, through a port 362. Constant pressure entering at port 311 is blocked;

(b) Through line 279 to port 278 in shut-off valve 262, pushing piston 284 upwardly to allow constant pressure fluid entering port 285 to pass through port 288 and hence through line 286 to port 287 in distributor timer valve 175.

As the brake 75 is applied and spindle 4 slows down, wings 312 of governor 265 will gradually move toward the closed position, and at certain low speed, valve stem 313 will connect port 317 with port 316, allowing fluid under constant pressure to pass through port 319 of high-low shock valve 264. Since the lower end portion of piston 277 has a larger area than the upper end portion, piston 277 will be forced upwardly to again block off port 291 and also port 289 in valve 175.

At the same time fluid will pass from port 317 to port 320 in distributor pilot valve 263. Since the lower end portion of piston 281 has a larger area than the upper end portion, piston 281 will be forced upwardly to again allow consistant pressure fluid to pass from port 311 and through timer plug 310 to port 309 and hence to port 292 in distributor timer valve 175.

Distributor pilot valve 263 functions during a gear change cycle to delay any return movement of piston 203 toward its initial position until the spindle is rotating at a low speed. When the spindle reaches low speed, valve 263 will be actuated by the governor to permit piston 203 to move to the left, which will disengage the brake and engage the low speed clutch. There will be no shock on clutch 71, since spindle 4 has been permitted to slow down to a predetermined low speed before engagement of the clutch.

The right end portion of piston 203 has a greater diameter than the left end portion so that as fluid enters the valve chamber from port 292, the piston will be forced back against the pressure of fluid entering at port 266. The speed of return of piston 203 will be determined by the size of the restriction in timer plug 310.

By this time, drum 337 will have reached a point of rotation where the plunger of microswitch 351 reaches the end of the cam 347, thus opening the microswitch to de-energize solenoid valve 307. Port 292 in valve 175 will no longer be connected to drain but will be blocked off by valve stem 302 which has returned to its downward position. Fluid in port 305 and line 306 will be opened to drain line 109 through solenoid valve 307. Slight further rotation of turret 27 to the next position, i.e., where a new tool is positioned for presentation to the workpiece, will position drum 337 so that the microswitches are adjacent the next axial row of openings. Depending on what the new desired spindle speed is, trip buttons 346 will be positioned in at least some of the openings in this row to actuate the respective microswitches and solenoid valves so that the pistons in speed selector valve unit 176 will be positioned accordingly.

As piston 203 moves to the left, it first connects port 267 with a passageway 363 in the piston which in turn connects through a groove to port 268 and hence to drain. Opening port 267 to drain serves to drain port 280 in distributor pilot valve 263 and to drain port 278 in shut-off valve 262.

At the same time, piston 203 connects port 287 with port 198 through a suitable groove or recess. Fluid entering port 287 from shut-off valve 262 will pass through port 198 and:

(a) Through line 197 to a port 364 disposed in the upper end portion of brake pilot valve 114. Since the areas adjacent both ends of piston 137 are equal, and since equal pressure is incident on both ends thereof, the pressure due to spring 138 will force the piston downwardly to its normal position. This will prevent fluid pressure at port 273 from connecting with port 359 and brake 75. The brake will again be connected through ports 139 and 135 to clutch control valve 112 and drain, thus releasing the brake and leaving spindle 4 free to turn when transmission 74 meshes with one of the gears on member 98 so that the dragging motion of clutch 68 may continue;

(b) Through line 197 to port 231 in speed selector valve unit 176 to produce a shift of some or all of gear shifter units 207, 208 and 209 to change the position of the corresponding gear shifter transmissions in the headstock. Fluid will also pass through line 197 to solenoid 196 and port 194, but since the left end portion of piston 179 is larger in area than the right end portion, and since fluid is incident on the left end of piston 179, the piston will remain to the right.

As piston 203 moves further to the left, it connects port 204 to drain through passageway 363 and port 268. This will:

(a) Drain port 273 in brake pilot valve 114 producing no change in the valve since piston 137 is already in its downward position;

(b) Drain port 275 in high-low shock valve 264 producing no change in the valve since piston 277 is already in its upward position;

(c) Drain port 274 in forward and reverse pilot valve 110 to allow piston 117 to return to its normal downward position so that reduced pressure may pass from port 119 through port 123 and hence to forward clutch 68 to give a slight drag on the clutch and turn the gears in the headstock slowly to permit them to mesh without clashing;

(d) Drain port 206 in high-low pilot valve 177 to allow piston 190 to return to its normal downward position to allow constant pressure entering port 192 to pass through port 189 to port 184 in high-low clutch pilot valve 174 to engage the low clutch 71.

As piston 203 moves further to the left, it connects port 202 to drain through passageway 363 and port 268. This will:

(a) Drain port 355 leading to gear lock piston 356 to release the piston so that it engages one of the slots 357 in piston 214 and prevents the latter from drifting;

(b) Drain port 193 in high-low clutch pilot valve 174 to allow fluid entering at port 194 to push piston 179 to the left to provide disengagement of low clutch 71 and engagement of high clutch 70;

(c) Drain port 272 in pressure regulator pilot valve 111 to allow piston 120 to return to its normal upward position so that constant pressure will again pass directly from port 122 to port 119 and out through port 123 of valve 110 to forward clutch 68. Fluid passing in port 329 will again be blocked by valve 111, cutting out the reduced drag pressure on forward clutch 68.

Just before piston 203 reaches the end of its returned stroke, port 271 is indexed with port 287 so that fluid passes from port 287 through port 271 to port 283 of shut-off valve 262. This will return piston 284 to its normal downward position and cut off the flow of fluid from port 288 to port 287.

When piston 203 reaches the end of its return stroke, valve 175 will then be in its normal condition, as described above, and spindle 4 will be rotating at the designated new high speed.

A gear change from high to low speed, from low to another low, or from low to high will be dependent upon the placement of trip buttons 346 on drum 337, and will normally produce a functioning of the speed control mechanism in a manner substantially similar to that described above, with a forward and return stroke of piston 203 in valve 175. When the apparatus is functioning only in the low speed groups, as with a change from one low speed to another, valves 264 and 263 will remain in their normal upward position throughout.

The shut-off valve 262 functions as a safety device in the event that piston 203 does not move all the way to the right when a gear change cycle in the high speed group is initiated. The functioning of valve 262 is described more fully in my above identified copending application, of which this application is a continuation in part.

In some instances, as where it is desired to shift from a high to a low speed with a ratio of 8 to 1, it is not necessary to change transmission gears. With an initial high speed setting, there will be no trip button 346 on station 344 for actuating switch 352. Solenoid valve 196 will be in its normal open position and when piston 203 in valve 175 is at the left, ports 198 and 202 will be open to drain. Piston 179 in valve 174 will be to the left or high position. In this instance, the low speed may be quickly obtained by a light downward pressure on high-low trip lever 77. This will unseat a ball check 365 disposed in connection with port 289 of distributor timer valve 175. Fluid will drain from behind or to the right of piston 203, through a portion of port 289 and ball check 365 and out through a port 366 to drain, allowing fluid entering port 266 of valve 175 to push piston 203 to the right. Piston 203 will only go through a partial cycle and will only move until it has covered port 289, at which time the additional fluid to the right of the piston will prevent further movement thereof. Shifting of piston 203 partially to the right will uncover ports 202 and 204 only, producing the changes described above in regard to uncovering of these two ports. Piston 179 of high-low clutch pilot valve 174 will be pushed to the right, producing a disengagement of high speed clutch 70 and engagement of low speed clutch 71. Almost simultaneously the brake 75 will be applied and low clutch 70 will be disengaged temporarily. Forward clutch 68 will also be disengaged temporarily. The spindle will still be traveling at high speed.

At the high speed, port 319 of high-low shock valve 264 will be open to drain, and port 275 will receive fluid from port 204 to push piston 277 down and open port 289 in valve 175 to drain. When wings 312 begin to close, piston 277 will be forced up again and block port 291 and thus close port 289. Since high-low trip lever 77 was only depressed momentarily, there is now no drain behind piston 203 and the piston will return to its normal position, producing changes similar to those described above. There will be no change of gears, since there has been no indexing of drum 337. Piston 179 will remain at the right.

The high-low shock valve 264 functions during a change from an eight-to-one high-to-low speed to delay any return movement of piston 203 towards its initial position until the spindle is at a low speed. When the spindle reaches low speed, valve 264 will be actuated by the governor to permit piston 203 to move to the left, which will disengage the brake and engage the low speed clutch. There will be no shock on the low speed clutch, since spindle 4 has been permitted to slow down to a predetermined low speed before engagement of the clutch.

When it is desired to go back to the original high speed from low, the high-low trip lever 77 is moved upwardly momentarily to the "high" position. This unseats a ball check 367 at the extreme right end portion of the piston chamber of valve 175, draining the adjacent portion of the chamber through a port 368 and allowing piston 203 to travel all the way to the right and back again to produce the full cycle substantially as described above. Again there will be no gear shift since drum 337 has not been indexed. On the return stroke of piston 203, port 193 in high-low clutch pilot valve 174 will be opened to drain and fluid will pass from port 198 through solenoid 196 and line 195 to port 194 to return piston 179 to the left or high position. Low speed clutch 71 will be disengaged and high speed clutch 70 will again be engaged.

Shock absorbers are included in the hydraulic circuit to reduce the sudden shock incident on the forward and reverse clutches when either is being engaged, as when starting the spindle. A shock absorber unit, indicated generally at 369 in Fig. 13 of the drawings, contains a pair of chambers with each chamber connected to one of the lines 163 or 169 leading to forward and reverse clutches 68 and 69 respectively. Shock absorber unit 369 may be of any suitable type, and is shown as having spring-biased pistons within the chamber.

In many instances, it is desirable to be able to jog or inch the spindle around a slight amount to bring the spindle into a desirable position for chucking, unchucking or the like. This may be accomplished by use of the inching valve 115 when clutch control valve 112 is in neutral position.

When clutch control valve 112 is in neutral position and spindle 4 is stopped, it is also often desirable to be able to turn the spindle by hand. This may be accomplished by use of free spindle valve 113, which is actuated through a shaft by a lever 370 mounted on the headstock casing.

Functioning of valves 115 and 113 is described more fully in my identified copending application.

A suitable pressure relief valve 371 may be disposed at any suitable point in the hydraulic circuit. Valve 371 is shown in Fig. 12 as being disposed between pump line 106 and cascade line 153, and provides oil to cascade 154 when fluid is not flowing through the hydraulic circuit.

In some instances, such as for retracting a tap, it is desirable to reverse the direction of spindle rotation during one or more of the tool feed operations. Manual control of forward and reverse spindle direction is provided by clutch control valve 112. However, automatic reversal of spindle direction during machining may be obtained by utilization of reversing valve 160. As shown in Fig. 14, valve stem 161 has a smaller area at the lower end than at the top end. This lower end is connected by a port 372 to constant pressure line 106. The upper end portion of valve 160 is provided with a port 373 which connects through a line 374 to a solenoid valve 375.

Solenoid valve 375 is connected to constant pressure line 106, and is also provided with a connection to drain line 109. Valve 375 is normally closed, and under these conditions, constant pressure fluid from line 106 is blocked, and port 373 in valve 160 is connected through the solenoid valve to drain line 109. Constant pressure entering at port 372 will keep valve stem 161 at the upper or normal position. When clutch control valve 112 is in the forward position, fluid from port 150 will be directed through valve 160 to forward clutch port 164; when valve 112 is in the reverse position, fluid from port 165 will be directed through valve 160 to reverse clutch port 170.

To control valve 375, a microswitch 376 is connected in series with the series connected switch 353 and with the winding of solenoid valve 375 across power lines 354. Switch 376 is mounted on top of saddle 6, and is actuated by selectively placed trip button 346 on station 345 of drum 337.

Switch 376 is adapted to be actuated by a dog 377 adjustably mounted on a horizontal arm 378 extending from a bracket 379 on the top of ram 8. As ram 8 is fed forward, dog 377 will actuate switch 376 at a time depending on the adjusted position of the dog on arm 378. The placement of dog 377 provides a preselected condition of the apparatus.

Assume that clutch control valve 112 is to be in the forward position during a complete machining operation, and assume that when turret 27 is indexed to present a particular tool, such as a tap, to the workpiece, it is desired to automatically reverse the direction of spindle rotation at a particular portion of the tool feed. A trip button 346 will be placed on station 345 at the place corresponding to the desired indexed position of the turret when a reverse spindle rotation during feed is desired. When turret 27 is indexed to the desired position, control drum 337 will be rotated to a position where the trip button 346 actuates microswitch 353. This sets up the circuit so that actuation of switch 376 by dog 377 will energize solenoid valve 375.

Constant pressure fluid will then pass from valve 375 through line 374 to port 373 of reversing valve 160. Since the upper end of valve stem 161 has a larger area than the lower end, the latter will be pushed downwardly to the reversing position. Forward clutch 68 will be opened through port 162 to drain line 169. Any fluid entering port 159 will now be shunted through a passageway 380 in stem 161 and hence to port 168 and line 169 to reverse clutch port 170. Port 167 will be blocked from port 168.

It will thus be seen that fluid which normally will flow to forward clutch 68 will be shunted to reverse clutch 69 in response to a preselected position of control drum 337. Valve 112 remains in the forward position, the reversing being accomplished by crossing hydraulic lines. Any shock on clutches 68 and 69 is substantially prevented by shock absorber unit 369.

As ram 8 is retracted, dog 377 will leave switch 376 to de-energize solenoid valve 375. Valve stem 161 will return upwardly, since port 373 will be connected through solenoid valve 375 to drain.

If the next forward feed stroke of ram 8 does not require a reversal of spindle 4, no trip button 346 is placed at station 345 for the next indexed position of turret 27, and solenoid valve 375 will not be energized, even though switch 376 is engaged by dog 377.

The entire speed control mechanism provides a novel means for changing the speed and direction of a rotatable member in response to various predetermined conditions occurring in an apparatus, such as in a machine tool or other suitable structure having a sequential cycle of operation. Where the invention is utilized in a machine tool, the predetermined conditions may be supplied by the various indexed positions of a control drum. In other apparatus, the predetermined conditions may be supplied in some other manner.

Various modes of carrying out the invention are contemplated as being within the scope of the following claims particularly pointing out and distinctly claiming the subject matter which is regarded as the invention.

I claim:

1. In a speed control apparatus for use in conjunction with a machine having an indexable turret, a rotatable member, a source of power, a plurality of transmission gears for driving said rotatable member at selectively different high and low speed ranges from said source of power, a fluid supply reservoir, a pressure pump for said fluid, fluid actuated high and low speed clutches connected between said source of power and said rotatable member with engagement of one of said clutches providing a corresponding high or low speed of rotation of said rotatable member, an indexable control member having a plurality of positions, means to index said control member in response to indexing of said turret, solenoid valve means selectively operable in response to positions of said control member, fluid pressure actuated distributor means adapted to be initially actuated by said solenoid valve means in response to indexing of said control member and with said distributor means comprising a valve having a piston reciprocable to produce an hydraulic cycle for shifting said transmission gears, gear shifting means, pilot valve means disposed hydraulically between said distributor means and said gear shifting means and adapted to selectively supply fluid from the former to the latter for actuating the latter during said cycle, said pilot valve means being selectively positioned by said solenoid valve means in response to an indexed position of said control member, and clutch pilot valve means hydraulically connected between said clutches and said distributor means to supply fluid to said clutches, said clutch pilot valve means being controlled by said solenoid valve means in response to an indexed position of said control member and being operable by said distributor means during a cycle to supply fluid selectively to either said high or low clutch to engage the same.

2. In a speed control apparatus for use with a machine having an indexable turret, a rotatable member, a source of power, means for driving said rotatable member from said source of power, a fluid supply reservoir, a pressure pump for said fluid, fluid actuated high and low speed clutches connected between said source of power and said rotatable member with engagement of one of said clutches providing a corresponding high or low speed of rotation of said rotatable member, an indexable control member having a plurality of positions, means to index said control member in response to indexing of said turret, solenoid valve means selectively operable in response to various positions of said control member, fluid pressure actuated distributor means adapted to be initially actuated by said solenoid valve means in response to indexing of said control member and with said distributor means comprising a valve having a piston reciprocable to produce an hydraulic cycle for changing the speed of said rotatable member, and clutch pilot valve means hydraulically connected between said distributor means and said clutches to supply fluid to the latter, said clutch pilot valve means being controlled by said solenoid valve means in response to an indexed position of said control member and being operable by said distributor means during a cycle in a manner dictated by said solenoid valve means to supply fluid selectively to either said high or low clutch to engage the same.

3. In a speed control apparatus for use with a machine having an indexable turret, a rotatable member, a source of power, means for driving said rotatable member from said source of power, a fluid supply reservoir, a pressure pump for said fluid, a fluid pressure actuated brake for said rotatable member, fluid pressure actuated high and low speed clutches connected between said source of power and said rotatable member with engagement of one of said clutches providing a corresponding high or low speed of rotation of said rotatable member, an indexable control member having a plurality of positions, means to index said control member in response to indexing of said turret, solenoid valve means selectively operable in response to various positions of said control member, fluid pressure actuated distributor means adapted to be initially actuated by said solenoid valve means and with said distributor means comprising a valve having a piston reciprocable to produce an hydraulic cycle for changing the speed of said rotatable member, said cycle including application of said brake to the rotatable member, clutch pilot valve means hydraulically connected between said clutches and said distributor means and being operable by the latter to supply fluid to either said high or low clutch to selectively engage the same, said clutch pilot valve means being controlled by said solenoid valve means in response to an indexed position of said control member, and means disposed between said pump and said clutch pilot valve means and actuated by said distributor means during a cycle to prevent the flow of fluid to the selectively engaged clutch while the brake is engaged.

4. In a speed control apparatus for use in conjunction with a machine having an indexable turret, a rotatable member, a source of power, a plurality of transmission gears for driving said rotatable member at selectively different high and low speed ranges from said source of power, a fluid supply reservoir, a pressure pump for said fluid, a fluid pressure actuated brake adapted to selectively engage or release said rotatable member, fluid pressure actuated high and low speed clutches connected between said source of power and said rotatable member with engagement of one of said clutches providing a corresponding high or low speed of rotation of the rotatable member, an indexable control member having a plurality of positions, means to index said turret, means to index said control member in response to indexing of said turret, solenoid valve means selectively operable in response to the positions of said indexable control member, a fluid pressure actuated distributor valve having a reciprocable piston adapted to be initially actuated by said solenoid valve means in response to indexing of said control member and with reciprocation of said piston producing an hydraulic cycle for shifting said transmission gears, said cycle including application of said brake to said rotatable member, gear shifting means, pilot valve means disposed hydraulically between said distributor valve and said gear shifting means and adapted to selectively supply fluid from the former to the latter for actuating the latter during said cycle, said pilot valve means being selectively positioned by said solenoid valve means in response to an indexed position of said control member, clutch pilot valve means hydraulically connected between said clutches and said distributor valve, said clutch pilot valve means being controlled by said solenoid valve means in response to an indexed position of said control member and being operable by said distributor valve in a manner dictated by said solenoid valve means during a cycle to supply fluid to either said high or low clutch to selectively engage the same, and means disposed between said pump and said clutch pilot valve means and actuated by said distributor valve during a cycle to prevent the flow of fluid to the selectively engaged clutch while the brake is engaged.

5. In a speed control apparatus, a rotatable member; a drive for said member including a forward drive clutch and a reverse drive clutch; a source of pressure fluid for actuating said clutches; a control valve for selectively directing fluid from said source to either of said clutches and having a forward position wherein pressure fluid is conducted to actuate said forward clutch to engage the same and drive said member in a forward direction, and having a reverse position wherein pressure fluid is conducted to actuate said reverse clutch to engage the same and drive said member in a reverse direction; and additional valve means connected between said control valve and said clutches to shunt pressure fluid being conducted to one of said clutches to the other clutch and thereby change the direction of rotation of said member without changing the position of said control valve.

6. In a speed control apparatus for use in conjunction with a machine having an indexable turret, a rotatable member; a drive for said member including a forward drive clutch and a reverse drive clutch; a source of pressure fluid for actuating said clutches; a manually operable control valve for selectively directing fluid from said source to either of said clutches and having a forward position wherein pressure fluid is conducted to actuate said forward clutch to engage the same and drive said member in a forward direction, and having a reverse position wherein pressure fluid is conducted to actuate said reverse clutch to engage the same and drive said member in a reverse direction; valve means connected between said control valve and said clutches to shunt pressure fluid being conducted to one of said clutches to the other clutch and thereby change the direction of rotation of said member without changing the position of said control valve; solenoid control means connected to said valve means; and means for automatically operating said solenoid control means in response to a selected indexed position of said turret and in accordance with a preselected condition of the apparatus.

7. In a speed control apparatus for use in conjunction with a machine having an indexable turret, a rotatable member; a drive for said member including a forward drive clutch and a reverse drive clutch; a source of pressure fluid for actuating said clutches; a manually operable control valve for selectively directing fluid from said source to either of said clutches and having a forward position wherein pressure fluid is conducted to actuate said forward clutch to engage the same and drive said member in a forward direction, and having a reverse position wherein pressure fluid is conducted to actuate said reverse clutch to engage the same and drive said member in a reverse direction; an indexable control member; means to index said turret; means to index said control member in response to indexing of said turret; solenoid valve means selectively operable in response to at least one indexed position of said indexable control member and in accordance with a preselected condition of the apparatus; and additional valve means connected to said source of pressure fluid and connected between said control valve and said clutches, said last-named valve means being controlled by said solenoid valve means and being operated thereby to shunt pressure fluid being conducted to one of said clutches to the other clutch and thereby change the direction of rotation of said member without changing the position of said control valve.

8. In a speed control apparatus for use in conjunction with a machine having an indexable turret, a rotatable member; a drive for said member including a forward drive clutch and a reverse drive clutch; a source of pressure fluid for actuating said clutches; a manually operable control valve for selectively directing fluid from said source to either of said clutches and having a forward position wherein pressure fluid is conducted to actuate said forward clutch to engage the same and drive said member in a forward direction, and having a reverse position wherein pressure fluid is conducted to actuate said reverse clutch to engage the same and drive said member in a reverse direction; an indexable control member having a plurality of index positions effected in sequence during a cycle of operation of the apparatus; means to index said turret; means to index said control member in response to indexing of said turret; first switch means actuatable in response to at least one indexed position of said indexable control member in accordance with a selected indexed position of said turret; second switch means actuatable in response to a preselected condition of the apparatus; solenoid valve means operable in response to actuation of both said switch means; additional valve means connected to said source of pressure fluid and connected between said control valve and said clutches with said additional valve means having a normal position in which fluid is permitted to pass to the forward or reverse clutch in response to the respective forward or reverse position of said control valve; said additional valve means being movable to a reversing position in response to actuation of said solenoid valve means by said first and second switch means to thereby shunt pressure fluid being conducted to one of said clutches to the other clutch to change the direction of rotation of said member without changing the position of said control valve.

9. In a speed control apparatus for use in a machine having an indexable turret, a rotatable member, a source of power, a plurality of transmission gears for driving said rotatable member at selectively different high and low speed ranges from said source of power, a fluid supply source, a pressure pump for said fluid, fluid actuated high and low speed clutches connected between said source of power and said rotatable member with engagement of one of said clutches providing a corresponding high or low speed of rotation of said rotatable member, fluid actuated forward and reverse drive clutches connected between said source of power and said rotatable member; a manually operable control valve for selectively directing fluid from said fluid supply source to either said forward or reverse clutch and having a forward drive position wherein pressure fluid is conducted to actuate said forward clutch to engage the same and drive said member in a forward direction, and having a reverse drive position wherein pressure fluid is conducted to actuate said reverse clutch to engage the same and drive said member in a reverse direction; fluid pressure actuated distributor means comprising a valve having a piston reciprocable to produce an hydraulic cycle for shifting said transmission gears when said control valve is in one of the drive positions, gear shifting means, first pilot valve means disposed hydraulically between said distributor means and said gear shifting means to selectively supply fluid from the former to the latter for actuating the latter during said cycle, second pilot valve means hydraulically connected between said high and low clutches and said distributor means to supply fluid to said high and low clutches, said second pilot valve means being operable by said distributor means during a cycle to supply fluid selectively to either said high or low clutch to engage the same, reversing valve means connected between said control valve and said forward and reverse clutches to shunt pressure fluid being conducted to one of said last-named clutches to the other of said last-named clutches and thereby change the direction of rotation of said rotatable member without changing the position of said control valve; solenoid control means connected to said first and second pilot valve means and to said reversing valve means, and means for automatically operating said solenoid control means in direct response to indexing of said turret.

10. In a speed control apparatus for use in a machine having an indexable turret, a rotatable member, a source of power, a plurality of transmission gears for driving said rotatable member at selectively different high and low speed ranges from said source of power, a fluid supply source, a pressure pump for said fluid, a fluid pressure actuated brake adapted to selectively engage or release said rotatable member, fluid pressure actuated high and low speed clutches connected between said source of power and said rotatable member with engagement of one of said clutches providing a corresponding high or low speed of rotation of the rotatable member; fluid actuated forward and reverse drive clutches connected between said source of power and said rotatable member; a manually operable control valve for selectively directing fluid from said fluid supply source to either said forward or reverse clutch and having a forward drive position wherein pressure fluid is conducted to actuate said forward clutch to engage the same and drive said member in a forward direction, and having a reverse drive position wherein pressure fluid is conducted to actuate said reverse clutch to engage the same and drive said member in a reverse direction; an indexable control member having a plurality of index positions effected in sequence by indexing of said turret during a cycle of operation of the apparatus, first switch means actuatable in response to indexing of said indexable control member, first solenoid valve means actuatable by said first switch means, fluid pressure actuated distributor means comprising a valve having a reciprocable piston adapted to be initially actuated by said first solenoid valve means in response to indexing of said indexable control member and with reciprocation of said piston producing an hydraulic cycle for shifting said transmission gears when said control valve is in one of the drive positions, said cycle including application of said brake to said rotatable member, gear shifting means, second switch means actuatable in response to an indexed position of said control member, second solenoid valve means actuatable by said second switch means, first pilot valve means disposed hydraulically between said distributor means and said gear shifting means and adapted to selectively supply fluid from the former to the latter for actuating the latter during said cycle, said first pilot valve means being selectively positioned by said second solenoid valve means, third switch means actuatable in response to an indexed position of said control member, third solenoid valve means actuatable by said third switch means, second pilot valve means being controlled by said third solenoid valve means and being operable by said distributor means in a manner dictated by said third solenoid valve means during a cycle to supply fluid to either said high or low clutch to selectively engage the same, fourth switch means actuatable in response to at least one indexed position of said indexable control member, fifth switch means actuatable in response to a preselected condition of the apparatus, fourth solenoid valve means operable in response to actuation of both said fourth and fifth switch means, additional valve means connnected to said fluid supply source and connected between said control valve and said forward and reverse clutches with said additional valve means having a normal position in which fluid is permitted to pass to the forward and reverse clutch in response to the respective forward or reverse position of said control valve, said additional valve means being movable to a reversing position in response to actuation of said fourth solenoid valve means by said fourth and fifth switch means when said turret is at a selected indexing position to thereby shunt pressure fluid being conducted to one of said last-named clutches to the other of said last-named clutches and thereby change the direction of rotation of said rotatable member without changing the position of said control valve, and means disposed between said pump and said second pilot valve means and actuated by said distributor means during a cycle to prevent the flow of fluid to the selectively engaged high or low clutch while the brake is engaged.

11. In an apparatus adapted for cyclical operation and having a rotatable member and having a separate indexable turret member movable to a plurality of different positions in sequence, a source of power, a plurality of transmission gears for driving said rotatable member at selectively different speeds from said source of power, a fluid supply reservoir, a pressure pump receiving fluid from said reservoir, a fluid pressure actuated distributor valve having a piston reciprocable to produce an hydraulic cycle utilizing pressure fluid from said pump for changing the speed of said rotatable member, gear shifting means actuated by operation of said distributor valve during said cycle and adapted to shift said transmission gears, valve means disposed between said distributor means and said gear shifting means to selectively supply fluid from the former to the latter during said cycle, and means responsive to the positions of said indexable turret member to control said valve means whereby the path of fluid flow between the distributor valve and the shifting means is determined in accordance with the desired selective shifting of said transmission gears.

References Cited in the file of this patent

UNITED STATES PATENTS

| | | |
|---|---|---|
| 2,050,520 | Carter | Aug. 11, 1936 |
| 2,384,809 | Bullard et al. | Sept. 18, 1945 |
| 2,574,301 | Soule et al. | Nov. 6, 1951 |